United States Patent
Huang et al.

(10) Patent No.: US 9,798,105 B2
(45) Date of Patent: Oct. 24, 2017

(54) IMAGING LENS SYSTEM, IMAGE CAPTURING UNIT AND ELECTRONIC DEVICE

(71) Applicant: Largan Precision Co., Ltd., Taichung (TW)

(72) Inventors: Hsin-Hsuan Huang, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/131,844

(22) Filed: Apr. 18, 2016

(65) Prior Publication Data
US 2017/0212331 A1    Jul. 27, 2017

(30) Foreign Application Priority Data
Jan. 22, 2016  (TW) .............................. 105102090 A

(51) Int. Cl.
| | |
|---|---|
| G02B 9/34 | (2006.01) |
| G02B 13/00 | (2006.01) |
| H04N 5/232 | (2006.01) |
| G02B 27/00 | (2006.01) |
| H04N 5/225 | (2006.01) |

(52) U.S. Cl.
CPC ............ *G02B 9/34* (2013.01); *G02B 13/004* (2013.01); *G02B 27/0025* (2013.01); *H04N 5/23238* (2013.01); *H04N 5/2254* (2013.01)

(58) Field of Classification Search
CPC ................................ G02B 9/34; G02B 13/004
USPC ................................................... 359/715, 781
See application file for complete search history.

(56) References Cited

U.S. PATENT DOCUMENTS

| | | | |
|---|---|---|---|
| 2013/0208365 A1* | 8/2013 | Hsu ........................ | G02B 13/02 359/715 |
| 2014/0160582 A1* | 6/2014 | Kubota .............. | G02B 13/0045 359/740 |

* cited by examiner

*Primary Examiner* — Darryl J Collins
(74) *Attorney, Agent, or Firm* — Nixon Peabody LLP

(57) ABSTRACT

An imaging lens system includes, in order from an object side to an image side, a first lens element, a second lens element, a third lens element and a fourth lens element. The first lens element with negative refractive power has an image-side surface being concave in a paraxial region thereof. The second lens element has negative refractive power. The third lens element has positive refractive power. The fourth lens element has negative refractive power. The imaging lens system has a total of four lens elements, and the imaging lens system further includes an aperture stop disposed between the second lens element and the third lens element.

26 Claims, 26 Drawing Sheets

IMAGING LENS SYSTEM, IMAGE CAPTURING UNIT AND ELECTRONIC DEVICE

RELATED APPLICATIONS

This application claims priority to Taiwan Application 105102090, filed Jan. 22, 2016, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

Due to the prevalence of wide-angle optical systems in electronic devices in recent years, such as smart phones, wearable devices, tablet personal computers, dashboard cameras and drones, optical systems have a trend for having a compact size, a wide viewing angle as well as being capable of forming high resolution images. However, the conventional wide-angle optical system has a long track length, thus it is unsuitable for use in compact electronic devices. Therefore, there is a need to develop an optical system featuring wide field of view, high image quality and compact size.

SUMMARY

According to one aspect of the present disclosure, an imaging lens system includes, in order from an object side to an image side, a first lens element, a second lens element, a third lens element and a fourth lens element. The first lens element with negative refractive power has an image-side surface being concave in a paraxial region thereof. The second lens element has negative refractive power. The third lens element has positive refractive power. The fourth lens element has negative refractive power. The imaging lens system has a total of four lens elements. The imaging lens system further includes an aperture stop disposed between the second lens element and the third lens element. When an axial distance between the first lens element and the second lens element is T12, an axial distance between the second lens element and the third lens element is T23, the following condition is satisfied:

$0 < T23/T12 < 0.45$.

According to another aspect of the present disclosure, an image capturing unit includes the aforementioned imaging lens system and an image sensor, wherein the image sensor is disposed on an image surface of the imaging lens system.

According to still another aspect of the present disclosure, an electronic device includes the aforementioned image capturing unit.

According to yet still another aspect of the present disclosure, an imaging lens system includes, in order from an object side to an image side, a first lens element, a second lens element, a third lens element and a fourth lens element. The first lens element with negative refractive power has an image-side surface being concave in a paraxial region thereof. The second lens element with negative refractive power has an image-side surface being concave in a paraxial region thereof. The third lens element has positive refractive power. The fourth lens element has negative refractive power. The imaging lens system has a total of four lens elements. The imaging lens system further includes an aperture stop disposed between the second lens element and the third lens element. When a central thickness of the first lens element is CT1, a central thickness of the second lens element is CT2, the following condition is satisfied:

$0 < CT2/CT1 < 3.5$.

According to yet still another aspect of the present disclosure, an imaging lens system includes, in order from an object side to an image side, a first lens element, a second lens element, a third lens element and a fourth lens element. The first lens element with negative refractive power has an image-side surface being concave in a paraxial region thereof. The second lens element with negative refractive power has an image-side surface being concave in a paraxial region thereof. The third lens element with positive refractive power has an object-side surface being convex in a paraxial region thereof. The fourth lens element has negative refractive power. The imaging lens system has a total of four lens elements. When a curvature radius of the image-side surface of the second lens element is R4, a curvature radius of the object-side surface of the third lens element is R5, a central thickness of the second lens element is CT2, an axial distance between the first lens element and the second lens element is T12, the following conditions are satisfied:

$0 < R5/R4 < 0.70$; and $0 < CT2/T12 < 3.0$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
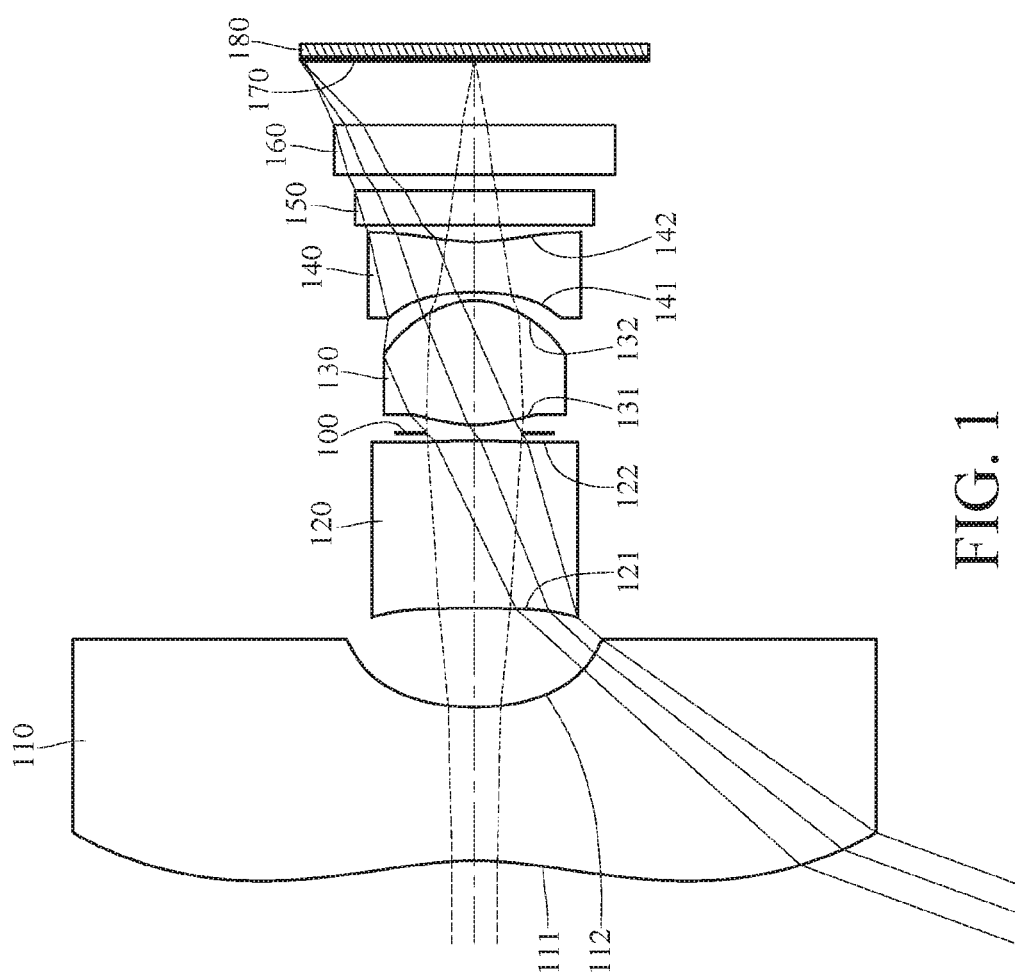
FIG. 1 is a schematic view of an image capturing unit according to the 1st embodiment of the present disclosure.

An imaging lens system includes, in order from an object side to an image side, a first lens element, a second lens element, a third lens element and a fourth lens element. The imaging lens system has a total of four lens elements.

There can be an air gap in a paraxial region between every two lens elements of the imaging lens system that are adjacent to each other; that is, each of the first through the fourth lens elements can be a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there can be an air gap in a paraxial region between every two lens elements of the imaging lens system that are adjacent to each other in the present disclosure for solving the problem generated by the cemented lens elements.

The first lens element with negative refractive power has an image-side surface being concave in a paraxial region thereof; therefore, it is favorable for providing the imaging lens system with a retrofocus configuration for the light at large field of view to transmit into the imaging lens system. Furthermore, the first lens element can have an object-side surface being concave in a paraxial region thereof; therefore, it is favorable for the light at large field of view to transmit into the imaging lens system so as to enlarge the imaging area. Moreover, at least one of the object-side surface and the image-side surface of the first lens element can have at least one inflection point; therefore, it is favorable for reducing a total track length of the imaging lens system so as to obtain wide angle characteristic and compactness while correcting aberrations at the off-axis region.

The second lens element with negative refractive power can have an object-side surface being concave in a paraxial region thereof and an image-side surface being concave in a paraxial region thereof. Therefore, the first and second lens elements are favorable for properly distributing the negative refractive power of the retrofocus configuration so as to reduce the sensitivity of the imaging lens system and correct aberrations generated by the enlarged field of view.

The third lens element with positive refractive power can have an object-side surface being convex in a paraxial region thereof. Therefore, it is favorable for providing sufficient capability for convergence of the incident light so as to reduce the total track length of the imaging lens system.

The fourth lens element with negative refractive power can have an image-side surface being concave in a paraxial region thereof; therefore, it is favorable for correcting Petzval sum of the imaging lens system so as to improve the flatness of an image surface and reduce astigmatism. Furthermore, at least one of an object-side surface and the image-side surface of the fourth lens element can have at least one inflection point; therefore, it is favorable for correcting aberrations at the off-axis region of the image side so as to improve the resolution at the peripheral region of the image.

When an axial distance between the first lens element and the second lens element is T12, an axial distance between the second lens element and the third lens element is T23, the following condition is satisfied: 0<T23/T12<0.45. Therefore, the spatial arrangement in the imaging lens system is properly arranged so that it is favorable for assembling the lens elements of the imaging lens system. Preferably, the following condition can also be satisfied: 0<T23/T12<0.25.

When a central thickness of the first lens element is CT1, a central thickness of the second lens element is CT2, the following condition is satisfied: 0<CT2/CT1<3.5. Therefore, it is favorable for arranging the thicknesses of the first and second lens elements so as to improve the image quality. Preferably, the following condition can also be satisfied: 0<CT2/CT1<2.0.

When a curvature radius of the image-side surface of the second lens element is R4, a curvature radius of the object-side surface of the third lens element is R5, the following condition is satisfied: 0<R5/R4<0.70. Therefore, it is favorable for distributing sufficient refractive power on the image side of the imaging lens system so as to obtain proper track length.

When the central thickness of the second lens element is CT2, the axial distance between the first lens element and the second lens element is T12, the following condition is satisfied: 0<CT2/T12<3.0. Therefore, the interference between the first and second lens elements is prevented so that it is favorable for assembling the first and second lens elements.

When the central thickness of the second lens element is CT2, a central thickness of the third lens element is CT3, the following condition can be satisfied: CT3/CT2<1.20. Therefore, it is favorable for properly arranging the thicknesses of the second and third lens elements so as to improve the image quality while reducing the sensitivity of the imaging lens system.

When a half of a maximal field of view of the imaging lens system is HFOV, the following condition can be satisfied: 1.40<tan (HFOV). Therefore, it is favorable for enlarging the field of view so as to obtain wide angle characteristic, and thereby the imaging lens system is applicable to different kinds of electronic devices.

When a curvature radius of the object-side surface of the fourth lens element is R7, a curvature radius of the image-side surface of the fourth lens element is R8, the following condition can be satisfied: −2.50<(R7+R8)/(R7−R8)<2.60. Therefore, the curvature radii of the two surfaces of the fourth lens element are properly arranged so that it is favorable for an easier molding process. Furthermore, it is favorable for preventing the surfaces of the fourth lens element from being overly curved so as to increase the manufacturing yield rate.

The imaging lens system can include an aperture stop. When an axial distance between the object-side surface of the second lens element and the aperture stop is Dr3$s$, an axial distance between the image-side surface of the second lens element and the aperture stop is Dr4$s$, an axial distance between the object-side surface of the third lens element and the aperture stop is Dr5$s$, an axial distance between an image-side surface of the third lens element and the aperture stop is Dr6$s$, the following conditions can be satisfied: 0<|Dr4$s$/Dr3$s$|<0.80; and 0<|Dr5$s$/Dr6$s$|<0.80. Therefore, the arrangement of the aperture stop, which is symmetrical within the structure of the imaging lens system, is favorable for enhancing the image quality. Preferably, the following conditions can also be satisfied: 0<|Dr4$s$/Dr3$s$|<0.50; and 0<|Dr5$s$/Dr6$s$|<0.50.

When a focal length of the first lens element is f1, a focal length of the fourth lens element is f4, the following condition can be satisfied: 0<f4/f1<1.0. Therefore, it is favorable for balancing the refractive power distribution on the object side and the image side of the imaging lens system so as to move the principal point towards the object side of the imaging lens system, thereby reducing the back focal length so as to maintain a compact size of the imaging lens system.

When an Abbe number of the fourth lens element is V4, the following condition can be satisfied: V4<25.0. Therefore, it is favorable for correcting chromatic aberration so as to prevent overlapping images.

When the curvature radius of the object-side surface of the third lens element is R5, a curvature radius of the image-side surface of the third lens element is R6, the following condition can be satisfied: −1.0<(R5+R6)/(R5−R6)<1.0. Therefore, the shapes of the third lens element on the object-side surface and the image-side surface are symmetrical so that it is favorable for correcting aberrations. Preferably, the following condition can also be satisfied: 0<(R5+R6)/(R5−R6)<0.6.

When the axial distance between the first lens element and the second lens element is T12, a focal length of the imaging lens system is f, the following condition can be satisfied: 0.45<T12/f. Therefore, the axial distance between the first lens element and the second lens element is sufficient so that it is favorable for disposing additional opto-mechanical components in the imaging lens system.

When an axial distance between the aperture stop and the image surface is SL, an axial distance between the object-side surface of the first lens element and the image surface is TL, the following condition can be satisfied: 0.10<SL/TL<0.48. Therefore, it is favorable for arranging the position of the aperture stop so as to enlarge the field of view, thereby improving the wide angle characteristic.

When the axial distance between the object-side surface of the first lens element and the image surface is TL, the focal length of the imaging lens system is f, the following condition can be satisfied: 4.8<TL/f. Therefore, it is favorable for providing sufficient field of view for more of the scenes to be captured in the image. Preferably, the following condition can also be satisfied: 5.5<TL/f.

There can be a front lens group and a rear lens group. The front lens group includes at least one lens element of the imaging lens system, and the rear lens group includes the other at least one lens element of the imaging lens system. The front lens group is located between the imaged object and the aperture stop, and the rear lens group is located between the aperture stop and the image surface. When a focal length of the front lens group is ff, a focal length of the rear lens group is fr, the following condition can be satisfied: −1.5<ff/fr<−1.0. Therefore, it is favorable for balancing the refractive power distribution of the imaging lens system on opposite two sides of the aperture stop so as to obtain large aperture and compact size simultaneously. According to the disclosure, either of the front lens group or the rear lens group may include at least one lens elements. When the front or rear lens group includes only one lens element, the focal length of the front or rear lens group is equal to a focal length of the lens element. When the front or rear lens group includes multiple lens elements, the focal length of the front or rear lens group is equal to a composite focal length of the lens elements.

When the central thickness of the second lens element is CT2, a sum of central thicknesses of the lens elements of the imaging lens system is ΣCT (that is, a sum of the central thickness of the first lens element, the central thickness of the second lens element, the central thickness of the third lens element and a central thickness of the fourth lens element), the following condition can be satisfied: 0<CT2/ΣCT<0.45. Therefore, it is favorable for arranging the lens elements so as to increase the manufacturing yield rate and keep the imaging lens system compact.

According to the present disclosure, the lens elements of the imaging lens system can be made of glass or plastic material. When the lens elements are made of glass material, the refractive power distribution of the imaging lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the imaging lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the imaging lens system on the corresponding image sensor can be flat or curved, particularly a concave curved surface facing towards the object side of the imaging lens system.

According to the present disclosure, the imaging lens system can include at least one stop, such as an aperture stop, a glare stop or a field stop. Said glare stop or said field stop is allocated for eliminating the stray light and thereby improving the image quality thereof.

According to the present disclosure, an aperture stop can be adapted for a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned imaging lens system and an image sensor, wherein the image sensor is disposed on the image side and can be located on or near an image surface of the aforementioned imaging lens system. In some embodiments, the image capturing unit can further include a barrel member, a holding member or a combination thereof.

Figure 26:
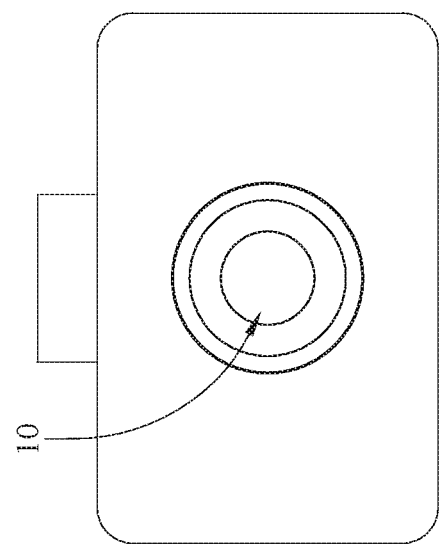
FIG. 26 shows an electronic device according to yet still another embodiment.

In FIG. 23, FIG. 24, FIG. 25 and FIG. 26, an image capturing unit 10 may be installed in, but not limited to, an electronic device, including a smart phone (FIG. 23), a tablet personal computer (FIG. 24), a wearable device (FIG. 25) or a dashboard camera (FIG. 26). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the imaging lens system can be optionally applied to optical systems with a movable focus. Furthermore, the imaging lens system is featured with good capability in aberration corrections and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
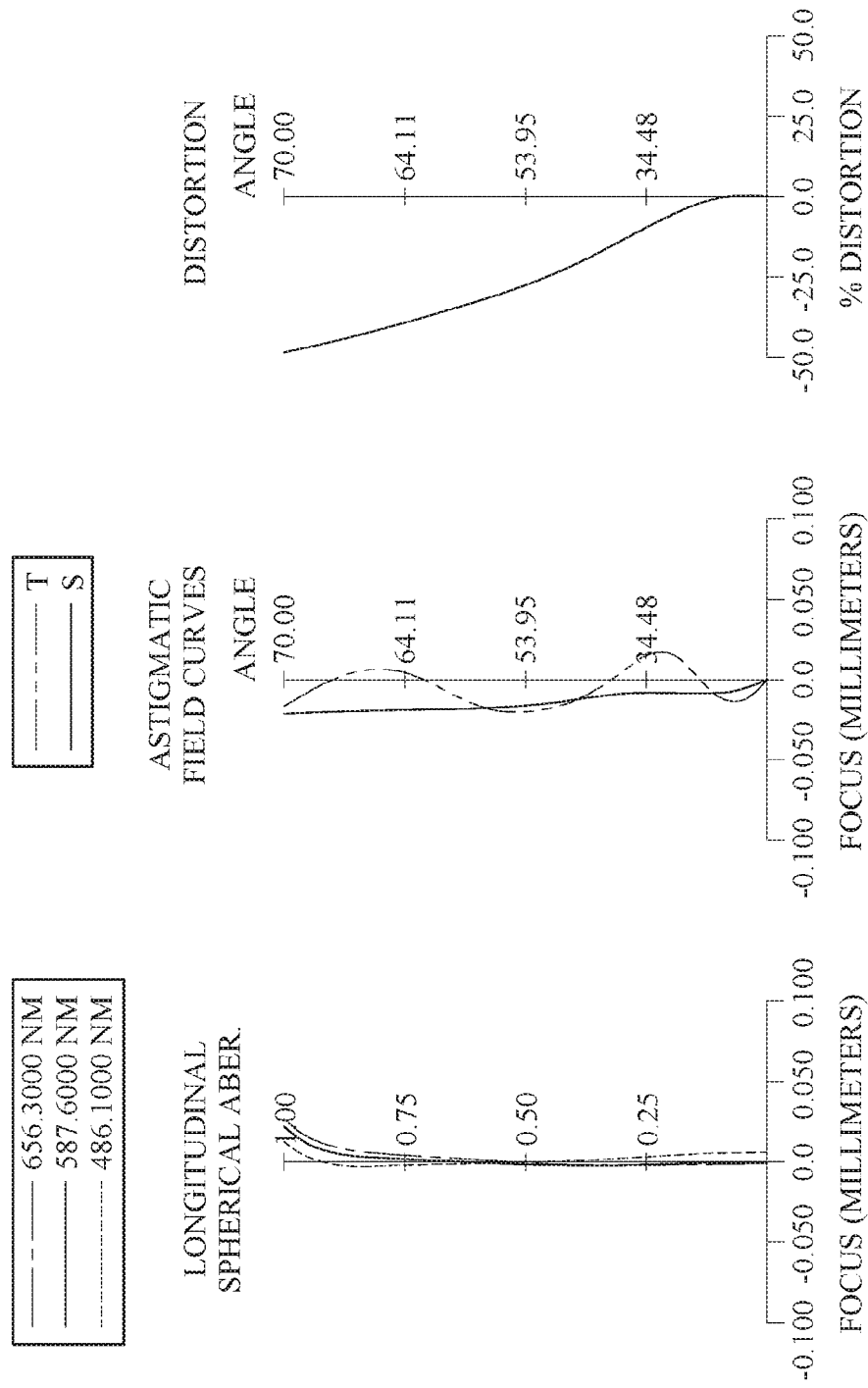
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens system (its reference numeral is omitted) of the present disclosure and an image sensor 180. The imaging lens system includes, in order from an object side to an image side, a first lens element 110, a second lens element 120, an aperture stop 100, a third lens element 130, a fourth lens element 140, an IR-cut filter 150, a cover glass 160 and an image surface 170, wherein the imaging lens system has a total of four single and non-cemented lens elements (110-140). A front lens group includes the first lens element 110 and the second lens element 120, and a rear lens group includes the third lens element 130 and the fourth lens element 140.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one inflection point.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. Both the object-side surface 141 and the image-side surface 142 of the fourth lens element 140 have at least one inflection point.

The IR-cut filter 150 and the cover glass 160 are made of glass material and located between the fourth lens element 140 and the image surface 170, and will not affect the focal length of the imaging lens system. The image sensor 180 is disposed on or near the image surface 170 of the imaging lens system.

The equation of the aspheric surface profiles of the aforementioned lens elements of the 1st embodiment is expressed as follows:

$$X(Y) = (Y^2/R)/(1 + sqrt(1-(1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens system of the image capturing unit according to the 1st embodiment, when a focal length of the imaging lens system is f, an f-number of the imaging lens system is Fno, and half of a maximal field of view of the imaging lens system is HFOV, these parameters have the following values: f=0.75 millimeters (mm); Fno=2.70; and HFOV=70.0 degrees (deg.).

When the half of a maximal field of view of the imaging lens system is HFOV, the following condition is satisfied: tan (HFOV)=2.75.

When an Abbe number of the fourth lens element 140 is V4, the following condition is satisfied: V4=23.8.

When an axial distance between the first lens element 110 and the second lens element 120 is T12, an axial distance between the second lens element 120 and the third lens element 130 is T23, the following condition is satisfied: T23/T12=0.17.

When the axial distance between the first lens element 110 and the second lens element 120 is T12, the focal length of the imaging lens system is f, the following condition is satisfied: T12/f=0.81.

When a central thickness of the second lens element 120 is CT2, the axial distance between the first lens element 110 and the second lens element 120 is T12, the following condition is satisfied: CT2/T12=1.69.

When a central thickness of the first lens element 110 is CT1, a central thickness of the second lens element 120 is CT2, the following condition is satisfied: CT2/CT1=1.09.

When the central thickness of the second lens element 120 is CT2, a central thickness of the third lens element 130 is CT3, the following condition is satisfied: CT3/CT2=0.74.

When the central thickness of the second lens element 120 is CT2, a sum of central thicknesses of the lens elements (110-140) of the imaging lens system is ΣCT, the following condition is satisfied: CT2/ΣCT=0.34.

When an axial distance between the object-side surface 121 of the second lens element 120 and the aperture stop 100 is Dr3s, an axial distance between the image-side surface 122 of the second lens element 120 and the aperture stop 100 is Dr4s, the following condition is satisfied: |Dr4s/Dr3s|=0.05.

When an axial distance between the object-side surface 131 of the third lens element 130 and the aperture stop 100 is Dr5s, an axial distance between the image-side surface 132 of the third lens element 130 and the aperture stop 100 is Dr6s, the following condition is satisfied: |Dr5s/Dr6s|=0.06.

When a curvature radius of the image-side surface 122 of the second lens element 120 is R4, a curvature radius of the object-side surface 131 of the third lens element 130 is R5, the following condition is satisfied: R5/R4=0.03.

When the curvature radius of the object-side surface 131 of the third lens element 130 is R5, a curvature radius of the image-side surface 132 of the third lens element 130 is R6, the following condition is satisfied: (R5+R6)/(R5−R6)=0.31.

When a curvature radius of the object-side surface 141 of the fourth lens element 140 is R7, a curvature radius of the image-side surface 142 of the fourth lens element 140 is R8, the following condition is satisfied: (R7+R8)/(R7−R8)=0.10.

When a focal length of the first lens element 110 is f1, a focal length of the fourth lens element 140 is f4, the following condition is satisfied: f4/f1=0.61.

When a focal length of the front lens group is ff, a focal length of the rear lens group is fr, the following condition is satisfied: ff/fr=−1.34. In this embodiment, ff is equal to a composite focal length of the first lens element 110 and the second lens element 120, and fr is equal to a composite focal length of the third lens element 130 and the fourth lens element 140.

When an axial distance between the object-side surface 111 of the first lens element 110 and the image surface 170 is TL, the focal length of the imaging lens system is f, the following condition is satisfied: TL/f=6.52.

When an axial distance between the aperture stop 100 and the image surface 170 is SL, the axial distance between the object-side surface 111 of the first lens element 110 and the image surface 170 is TL, the following condition is satisfied: SL/TL=0.47.

The detailed optical data of the 1st embodiment are shown in Table 1 and the aspheric surface data are shown in Table 2 below.

TABLE 1

1st Embodiment
f = 0.75 mm, Fno = 2.70, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.040 | (ASP) | 0.933 | Plastic | 1.544 | 56.0 | −1.45 |
| 2 | | 1.494 | (ASP) | 0.600 | | | | |
| 3 | Lens 2 | −52.992 | (ASP) | 1.015 | Plastic | 1.660 | 20.4 | −30.09 |
| 4 | | 31.999 | (ASP) | 0.050 | | | | |
| 5 | Ape. Stop | Plano | | 0.050 | | | | |
| 6 | Lens 3 | 0.816 | (ASP) | 0.756 | Plastic | 1.544 | 56.0 | 0.66 |
| 7 | | −0.432 | (ASP) | 0.050 | | | | |
| 8 | Lens 4 | −1.307 | (ASP) | 0.306 | Plastic | 1.634 | 23.8 | −0.88 |
| 9 | | 1.062 | (ASP) | 0.100 | | | | |
| 10 | IR-cut filter | Plano | | 0.210 | Glass | 1.517 | 64.2 | — |
| 11 | | Plano | | 0.100 | | | | |
| 12 | Cover glass | Plano | | 0.300 | Glass | 1.517 | 64.2 | — |
| 13 | | Plano | | 0.387 | | | | |
| 14 | Image | Plano | | — | | | | |

Note:
Reference wavelength is 587.6 nm (d-line).

TABLE 2

| Aspheric Coefficients | | | | |
|---|---|---|---|---|
| Surface # | 1 | 2 | 3 | 4 |
| k = | −2.5529E+01 | −1.9265E+01 | 5.0000E+01 | 5.0000E+01 |
| A4 = | 2.8433E−02 | 1.0078E+00 | −4.3301E−01 | −1.5104E+00 |
| A6 = | −2.6804E−03 | −1.5933E+00 | 6.3184E−01 | 1.1791E+01 |
| A8 = | 7.1141E−05 | 2.1366E+00 | −1.8349E+00 | −8.8323E+01 |
| A10 = | 7.6065E−06 | — | 2.1217E+00 | 3.7243E+02 |
| Surface # | 6 | 7 | 8 | 9 |
| k = | −5.7204E+00 | −1.9948E+00 | 1.3311E+00 | −1.8402E+01 |
| A4 = | −5.8782E−01 | 9.7538E−01 | 2.3818E−01 | −5.6427E−01 |
| A6 = | 4.4975E+00 | −1.0856E+01 | −3.1403E+00 | 1.6136E+00 |
| A8 = | −2.9208E+01 | 3.1737E+01 | −8.7568E+00 | −3.9347E+00 |
| A10 = | — | −4.7385E+01 | 3.5807E+01 | 4.3086E+00 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A10 represent the aspheric coefficients ranging from the 4th order to the 8th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
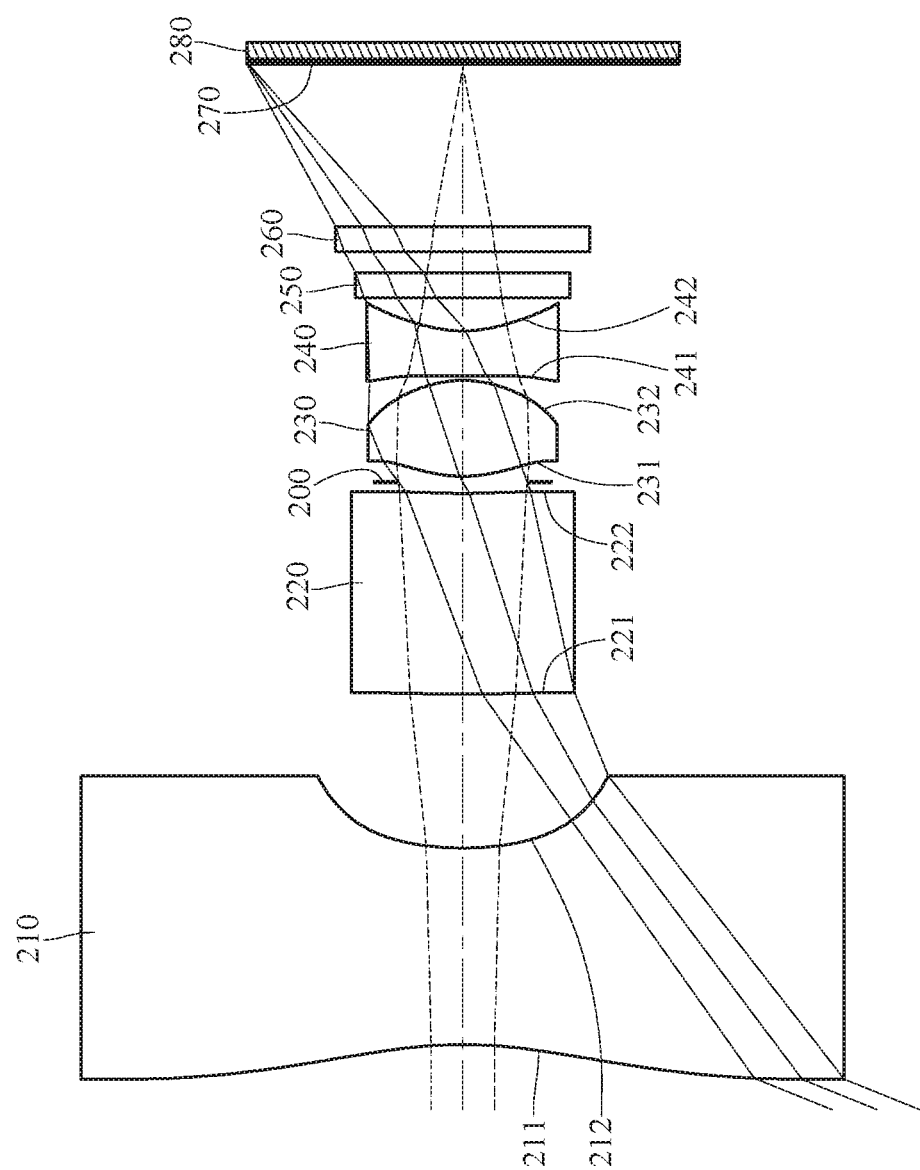
FIG. 3 is a schematic view of an image capturing unit according to the 2nd embodiment of the present disclosure.
Figure 4:
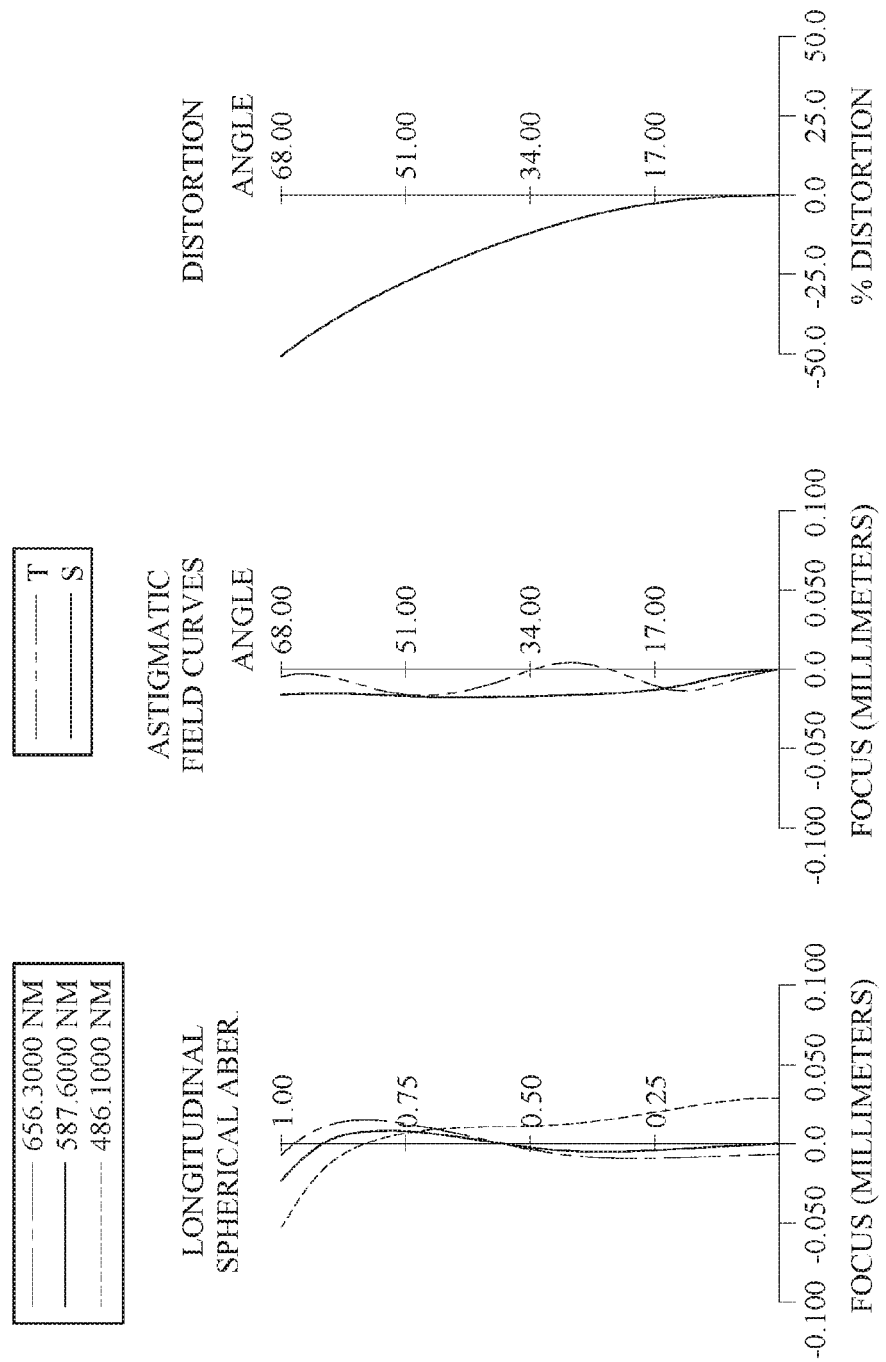
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens system (its reference numeral is omitted) of the present disclosure and an image sensor 280. The imaging lens system includes, in order from an object side to an image side, a first lens element 210, a second lens element 220, an aperture stop 200, a third lens element 230, a fourth lens element 240, an IR-cut filter 250, a cover glass 260 and an image surface 270, wherein the imaging lens system has a total of four single and non-cemented lens elements (210-240). A front lens group includes the first lens element 210 and the second lens element 220, and a rear lens group includes the third lens element 230 and the fourth lens element 240.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has at least one inflection point.

The IR-cut filter 250 and the cover glass 260 are made of glass material and located between the fourth lens element 240 and the image surface 270, and will not affect the focal length of the imaging lens system. The image sensor 280 is disposed on or near the image surface 270 of the imaging lens system.

The detailed optical data of the 2nd embodiment are shown in Table 3 and the aspheric surface data are shown in Table 4 below.

TABLE 3

2nd Embodiment
f = 2.12 mm, Fno = 2.80, HFOV = 68.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.052 | (ASP) | 2.348 | Plastic | 1.535 | 56.3 | −3.74 |
| 2 | | 3.838 | (ASP) | 1.836 | | | | |
| 3 | Lens 2 | 16.803 | (ASP) | 2.400 | Plastic | 1.660 | 20.4 | −20.99 |
| 4 | | 7.162 | (ASP) | 0.135 | | | | |
| 5 | Ape. Stop | Plano | | 0.069 | | | | |

TABLE 3-continued

2nd Embodiment
f = 2.12 mm, Fno = 2.80, HFOV = 68.0 deg.

| Surface # | | Curvature Radius | | Thickness | Material | Index | Abbe # | Focal Length |
|---|---|---|---|---|---|---|---|---|
| 6 | Lens 3 | 1.615 | (ASP) | 1.146 | Plastic | 1.530 | 55.8 | 1.60 |
| 7 | | −1.338 | (ASP) | 0.051 | | | | |
| 8 | Lens 4 | 13.791 | (ASP) | 0.539 | Plastic | 1.634 | 23.8 | −2.63 |
| 9 | | 1.464 | (ASP) | 0.400 | | | | |
| 10 | IR-cut filter | Plano | | 0.300 | Glass | 1.517 | 64.2 | — |
| 11 | | Plano | | 0.250 | | | | |
| 12 | Cover glass | Plano | | 0.300 | Glass | 1.517 | 64.2 | — |
| 13 | | Plano | | 1.941 | | | | |
| 14 | Image | Plano | | — | | | | |

Note:
Reference wavelength is 587.6 nm (d-line).

TABLE 4

Aspheric Coefficients

| Surface # | 1 | 2 | 3 | 4 |
|---|---|---|---|---|
| k = | −1.4837E+01 | −1.7320E+01 | −1.0000E+00 | 5.0000E+01 |
| A4 = | 2.6601E−03 | 6.6920E−02 | −1.0518E−02 | −1.2719E−01 |
| A6 = | −1.1199E−04 | −1.1551E−02 | 3.5629E−03 | 1.0308E−01 |
| A8 = | 2.3359E−06 | 3.8673E−03 | −2.0226E−03 | −8.5461E−02 |
| A10 = | −2.0557E−08 | — | 1.6303E−04 | 2.8326E−02 |

| Surface # | 6 | 7 | 8 | 9 |
|---|---|---|---|---|
| k = | −2.8560E+00 | −1.7534E+00 | 1.9139E+00 | −6.3864E+00 |
| A4 = | −7.6862E−02 | 5.3164E−02 | −9.3741E−02 | 1.3086E−02 |
| A6 = | 6.0234E−02 | −1.5099E−01 | 8.1384E−03 | 7.1834E−03 |
| A8 = | −7.2885E−02 | 9.5127E−02 | −2.2526E−03 | 3.2892E−03 |
| A10 = | — | −3.8848E−02 | 9.8031E−03 | −1.3260E−03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.12 | CT2/ΣCT | 0.37 |
| Fno | 2.80 | |Dr4s/Dr3s| | 0.05 |
| HFOV [deg.] | 68.0 | |Dr5s/Dr6s| | 0.06 |
| tan(HFOV) | 2.48 | R5/R4 | 0.23 |
| V4 | 23.8 | (R5 + R6)/(R5 − R6) | 0.09 |
| T23/T12 | 0.11 | (R7 + R8)/(R7 − R8) | 1.24 |
| T12/f | 0.87 | f4/f1 | 0.70 |
| CT2/T12 | 1.31 | ff/fr | −1.16 |
| CT2/CT1 | 1.02 | TL/f | 5.54 |
| CT3/CT2 | 0.48 | SL/TL | 0.43 |

3rd Embodiment

Figure 5:
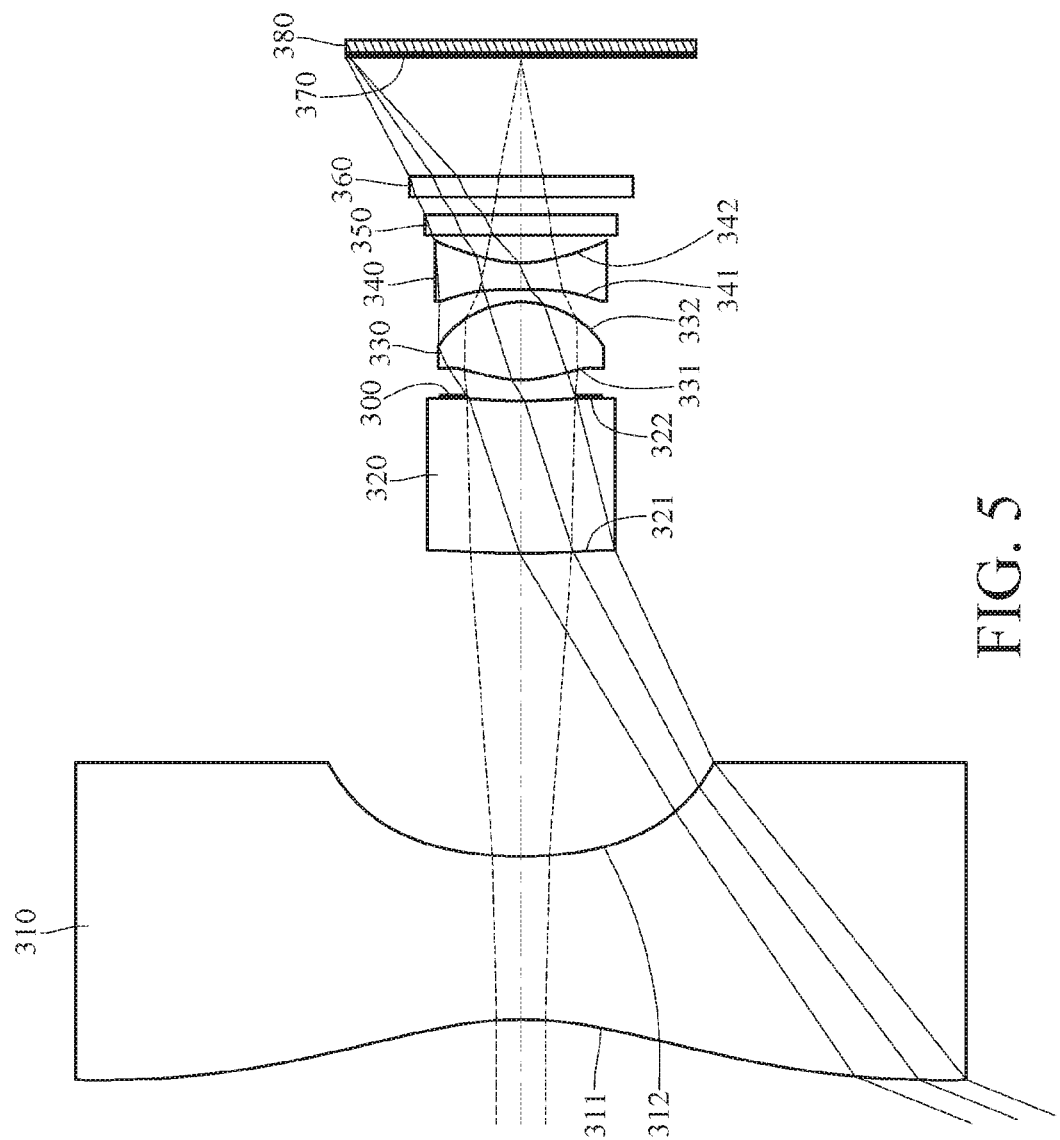
FIG. 5 is a schematic view of an image capturing unit according to the 3rd embodiment of the present disclosure.
Figure 6:
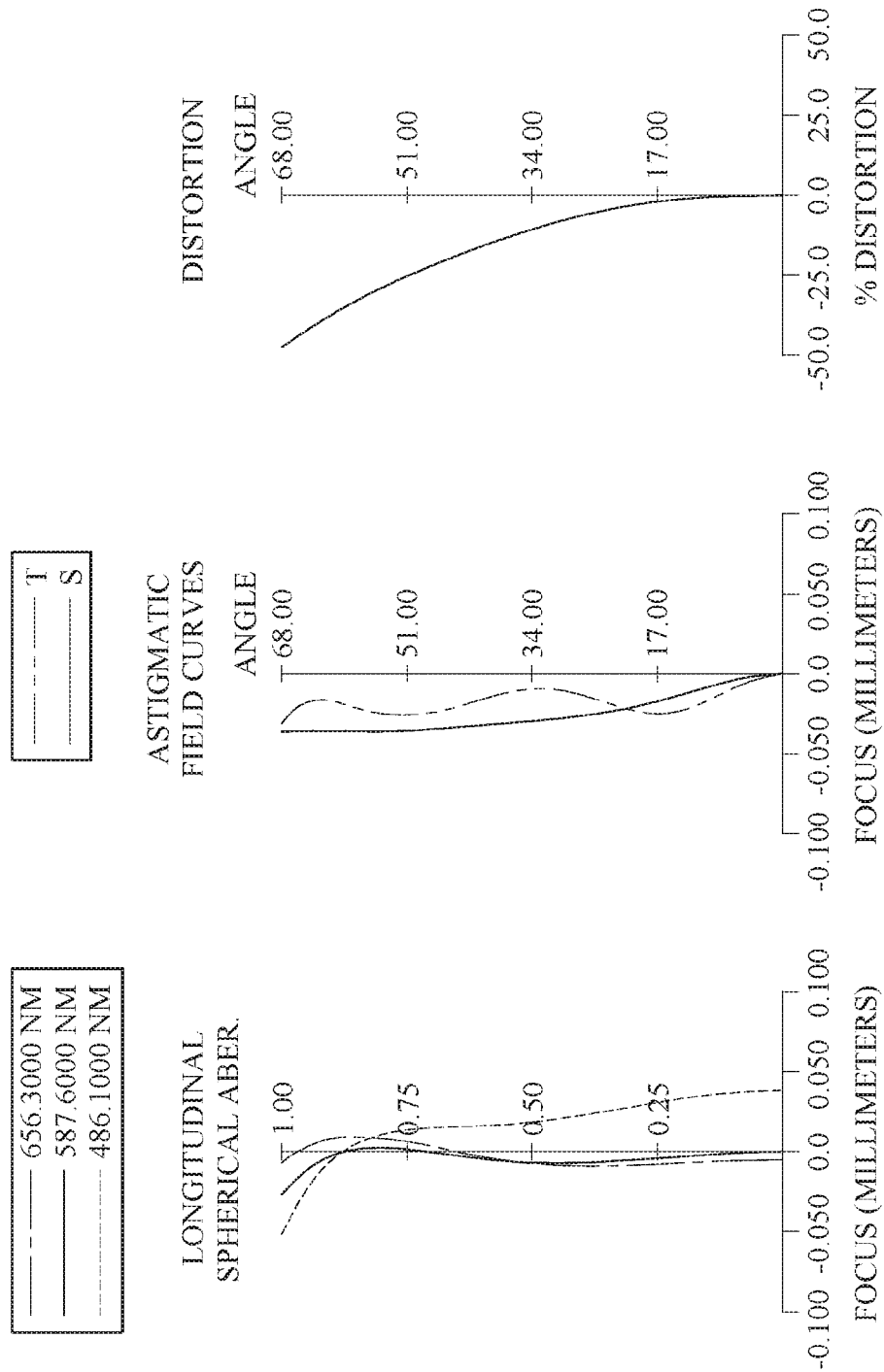
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens system (its reference numeral is omitted) of the present disclosure and an image sensor 380. The imaging lens system includes, in order from an object side to an image side, a first lens element 310, a second lens element 320, an aperture stop 300, a third lens element 330, a fourth lens element 340, an IR-cut filter 350, a cover glass 360 and an image surface 370, wherein the imaging lens system has a total of four single and non-cemented lens elements (310-340). A front lens group includes the first lens element 310 and the second lens element 320, and a rear lens group includes the third lens element 330 and the fourth lens element 340.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has at least one inflection point.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one inflection point.

The IR-cut filter 350 and the cover glass 360 are made of glass material and located between the fourth lens element 340 and the image surface 370, and will not affect the focal length of the imaging lens system. The image sensor 380 is disposed on or near the image surface 370 of the imaging lens system.

The detailed optical data of the 3rd embodiment are shown in Table 5 and the aspheric surface data are shown in Table 6 below.

corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.90 | CT2/ΣCT | 0.36 |
| Fno | 2.70 | |Dr4s/Dr3s| | 0.04 |
| HFOV [deg.] | 68.0 | |Dr5s/Dr6s| | 0.16 |
| tan(HFOV) | 2.48 | R5/R4 | 0.32 |
| V4 | 21.4 | (R5 + R6)/(R5 − R6) | 0.16 |
| T23/T12 | 0.07 | (R7 + R8)/(R7 − R8) | 0.84 |
| T12/f | 2.30 | f4/f1 | 0.45 |
| CT2/T12 | 0.51 | ff/fr | −1.32 |
| CT2/CT1 | 0.94 | TL/f | 7.30 |
| CT3/CT2 | 0.51 | SL/TL | 0.35 |

TABLE 5

3rd Embodiment
f = 1.90 mm, Fno = 2.70, HFOV = 68.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.704 | (ASP) | 2.348 | Plastic | 1.514 | 56.8 | −4.83 |
| 2 | | 6.137 | (ASP) | 4.354 | | | | |
| 3 | Lens 2 | 8.051 | (ASP) | 2.200 | Plastic | 1.660 | 20.4 | −36.24 |
| 4 | | 5.369 | (ASP) | 0.084 | | | | |
| 5 | Ape. Stop | Plano | | 0.219 | | | | |
| 6 | Lens 3 | 1.718 | (ASP) | 1.123 | Plastic | 1.530 | 55.8 | 1.57 |
| 7 | | −1.248 | (ASP) | 0.178 | | | | |
| 8 | Lens 4 | −17.452 | (ASP) | 0.382 | Plastic | 1.650 | 21.4 | −2.16 |
| 9 | | 1.541 | (ASP) | 0.400 | | | | |
| 10 | IR-cut filter | Plano | | 0.300 | Glass | 1.517 | 64.2 | — |
| 11 | | Plano | | 0.250 | | | | |
| 12 | Cover glass | Plano | | 0.300 | Glass | 1.517 | 64.2 | — |
| 13 | | Plano | | 1.712 | | | | |
| 14 | Image | Plano | | — | | | | |

Note:
Reference wavelength is 587.6 nm (d-line).

TABLE 6

| Aspheric Coefficients | | | | |
|---|---|---|---|---|
| Surface # | 1 | 2 | 3 | 4 |
| k = | −9.7118E+00 | −1.7320E+01 | −1.0000E+00 | 3.1087E+01 |
| A4 = | 1.0433E−03 | 1.8314E−02 | −2.0877E−02 | −1.2523E−01 |
| A6 = | −2.1090E−05 | −1.5539E−03 | −1.6524E−04 | 6.8251E−02 |
| A8 = | 2.3183E−07 | 1.5996E−04 | 2.9365E−04 | −3.2300E−02 |
| A10 = | −1.1326E−09 | — | −2.6867E−06 | −1.1006E−02 |
| Surface # | 6 | 7 | 8 | 9 |
| k = | −2.6127E+00 | −1.7832E+00 | 1.9140E+00 | −7.2133E+00 |
| A4 = | −7.8151E−02 | 4.4482E−02 | −1.3377E−01 | −2.8894E−02 |
| A6 = | 3.9541E−02 | −1.4770E−01 | 4.5182E−02 | 4.3109E−02 |
| A8 = | −5.2084E−02 | 9.8461E−02 | −1.2537E−02 | −1.7424E−02 |
| A10 = | — | −3.9124E−02 | 9.8031E−03 | 2.8158E−03 |

Figure 7:
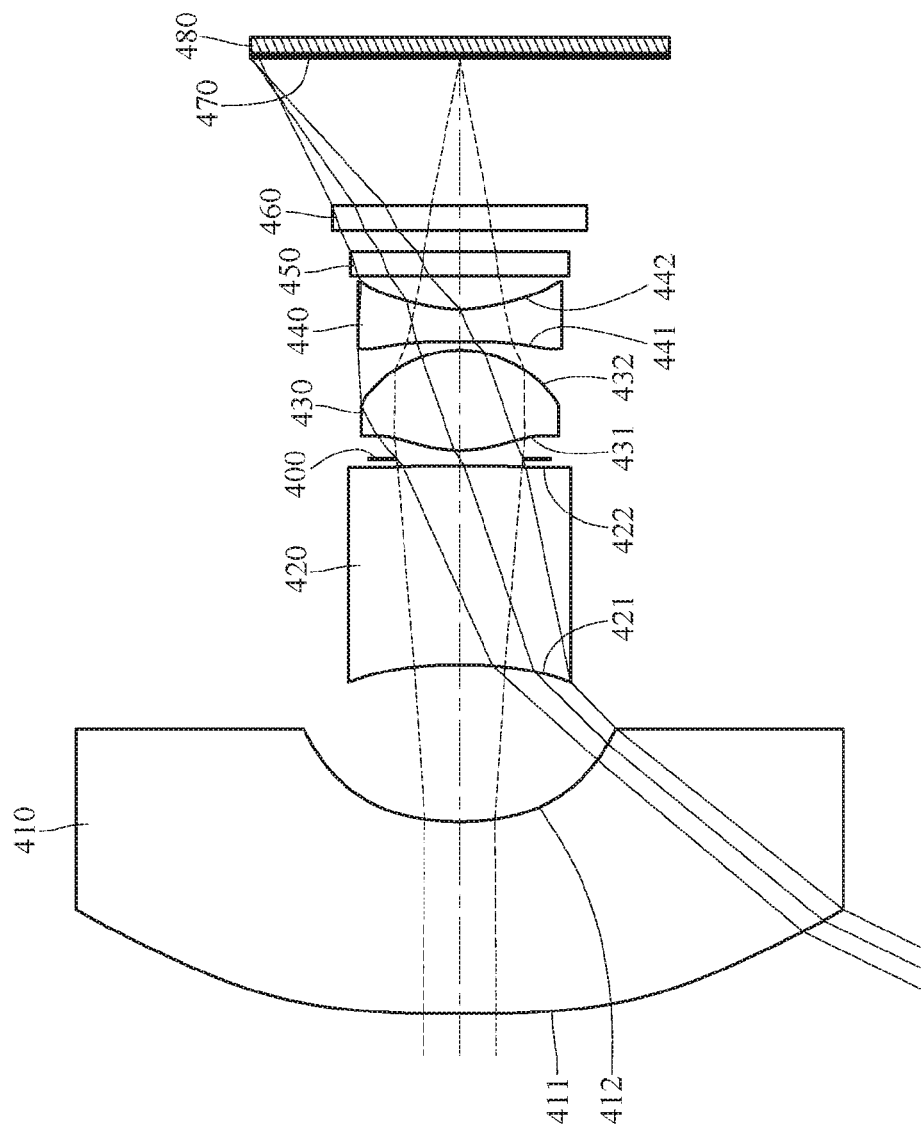
FIG. 7 is a schematic view of an image capturing unit according to the 4th embodiment of the present disclosure.
Figure 8:
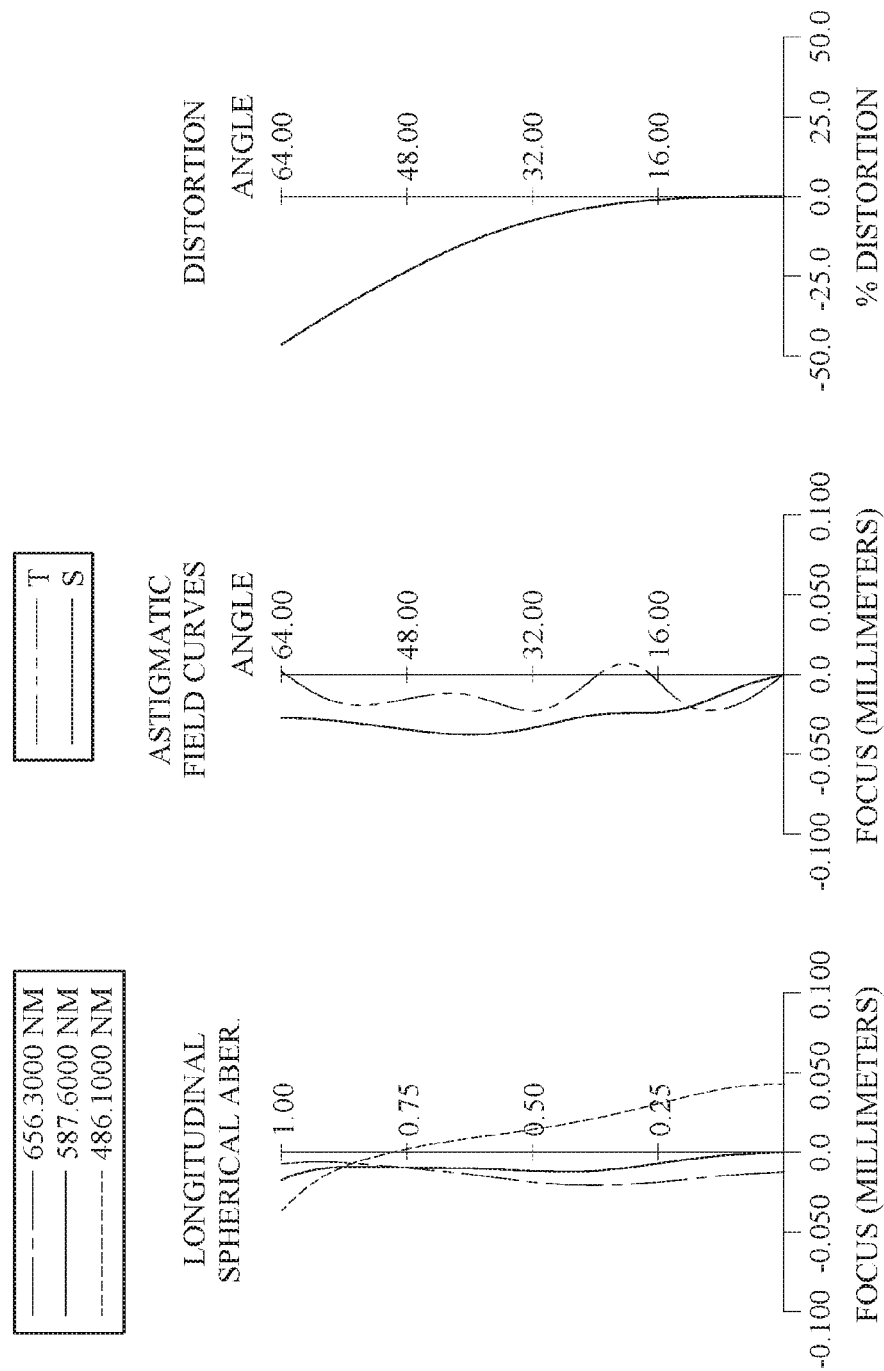
FIG. 8 shows spherical aberration curves, astigmatic field curves and a distortion curve of the image capturing unit according to the 4th embodiment.

In the 3rd embodiment, the equation of the aspheric surface profiles of the aforementioned lens elements is the same as the equation of the 1st embodiment. Also, the definitions of these parameters shown in the following table are the same as those stated in the 1st embodiment with 4th Embodiment FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens system (its reference numeral is omitted) of the present disclosure and an image sensor 480. The imaging lens system includes, in order from an object side to an image side, a first lens element 410, a second lens element 420, an aperture stop 400, a third lens element 430, a fourth lens element 440, an IR-cut filter 450, a cover glass 460 and an image surface 470, wherein the imaging lens system has a total of four single and non-cemented lens elements (410-440). A front lens group includes the first lens element 410 and the second lens element 420, and a rear lens group includes the third lens element 430 and the fourth lens element 440.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one inflection point.

The IR-cut filter 450 and the cover glass 460 are made of glass material and located between the fourth lens element 440 and the image surface 470, and will not affect the focal length of the imaging lens system. The image sensor 480 is disposed on or near the image surface 470 of the imaging lens system.

The detailed optical data of the 4th embodiment are shown in Table 7 and the aspheric surface data are shown in Table 8 below.

TABLE 7

4th Embodiment
f = 2.28 mm, Fno = 2.60, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 28.462 | (ASP) | 2.322 | Plastic | 1.535 | 56.3 | −6.86 |
| 2 | | 3.156 | (ASP) | 1.896 | | | | |
| 3 | Lens 2 | −5.414 | (ASP) | 2.400 | Plastic | 1.660 | 20.4 | −6.18 |
| 4 | | 19.505 | (ASP) | 0.086 | | | | |
| 5 | Ape. Stop | Plano | | 0.105 | | | | |
| 6 | Lens 3 | 1.555 | (ASP) | 1.210 | Plastic | 1.535 | 56.3 | 1.52 |
| 7 | | −1.239 | (ASP) | 0.099 | | | | |
| 8 | Lens 4 | 64.253 | (ASP) | 0.397 | Plastic | 1.634 | 23.8 | −2.58 |
| 9 | | 1.591 | (ASP) | 0.400 | | | | |
| 10 | IR-cut filter | Plano | | 0.300 | Glass | 1.517 | 64.2 | — |
| 11 | | Plano | | 0.250 | | | | |
| 12 | Cover glass | Plano | | 0.300 | Glass | 1.517 | 64.2 | — |
| 13 | | Plano | | 1.779 | | | | |
| 14 | Image | Plano | | — | | | | |

Note:
Reference wavelength is 587.6 nm (d-line).

TABLE 8

Aspheric Coefficients

| Surface # | 1 | 2 | 3 | 4 |
|---|---|---|---|---|
| k = | −2.2193E+01 | −1.6814E+01 | −1.0000E+00 | 5.0000E+01 |
| A4 = | 6.4580E−03 | 7.9733E−02 | −8.9561E−03 | −1.3848E−01 |
| A6 = | −3.5545E−04 | −1.1795E−02 | −5.7226E−03 | 1.6889E−01 |
| A8 = | 7.9016E−06 | 2.0732E−03 | 1.7703E−03 | −1.1851E−01 |
| A10 = | −4.6917E−08 | — | −1.7117E−04 | 4.9522E−02 |

| Surface # | 6 | 7 | 8 | 9 |
|---|---|---|---|---|
| k = | −3.0552E+00 | −1.7428E+00 | 1.9139E+00 | −7.7905E+00 |
| A4 = | −1.0762E−01 | 2.5865E−02 | −1.6951E−01 | −5.4104E−02 |
| A6 = | 9.7014E−02 | −1.2270E−01 | 1.0920E−01 | 8.3962E−02 |
| A8 = | −9.5554E−02 | 8.9847E−02 | −2.6559E−02 | −3.4515E−02 |
| A10 = | — | −4.0775E−02 | 7.4157E−03 | 1.3348E−02 |
| A12 = | — | — | 3.1663E−04 | −2.1324E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.28 | CT2/ΣCT | 0.38 |
| Fno | 2.60 | |Dr4s/Dr3s| | 0.03 |
| HFOV [deg.] | 64.0 | |Dr5s/Dr6s| | 0.08 |
| tan(HFOV) | 2.05 | R5/R4 | 0.08 |
| V4 | 23.8 | (R5 + R6)/(R5 − R6) | 0.11 |
| T23/T12 | 0.10 | (R7 + R8)/(R7 − R8) | 1.05 |
| T12/f | 0.83 | f4/f1 | 0.38 |
| CT2/T12 | 1.27 | ff/fr | −1.31 |
| CT2/CT1 | 1.03 | TL/f | 5.06 |
| CT3/CT2 | 0.50 | SL/TL | 0.42 |

5th Embodiment

Figure 9:
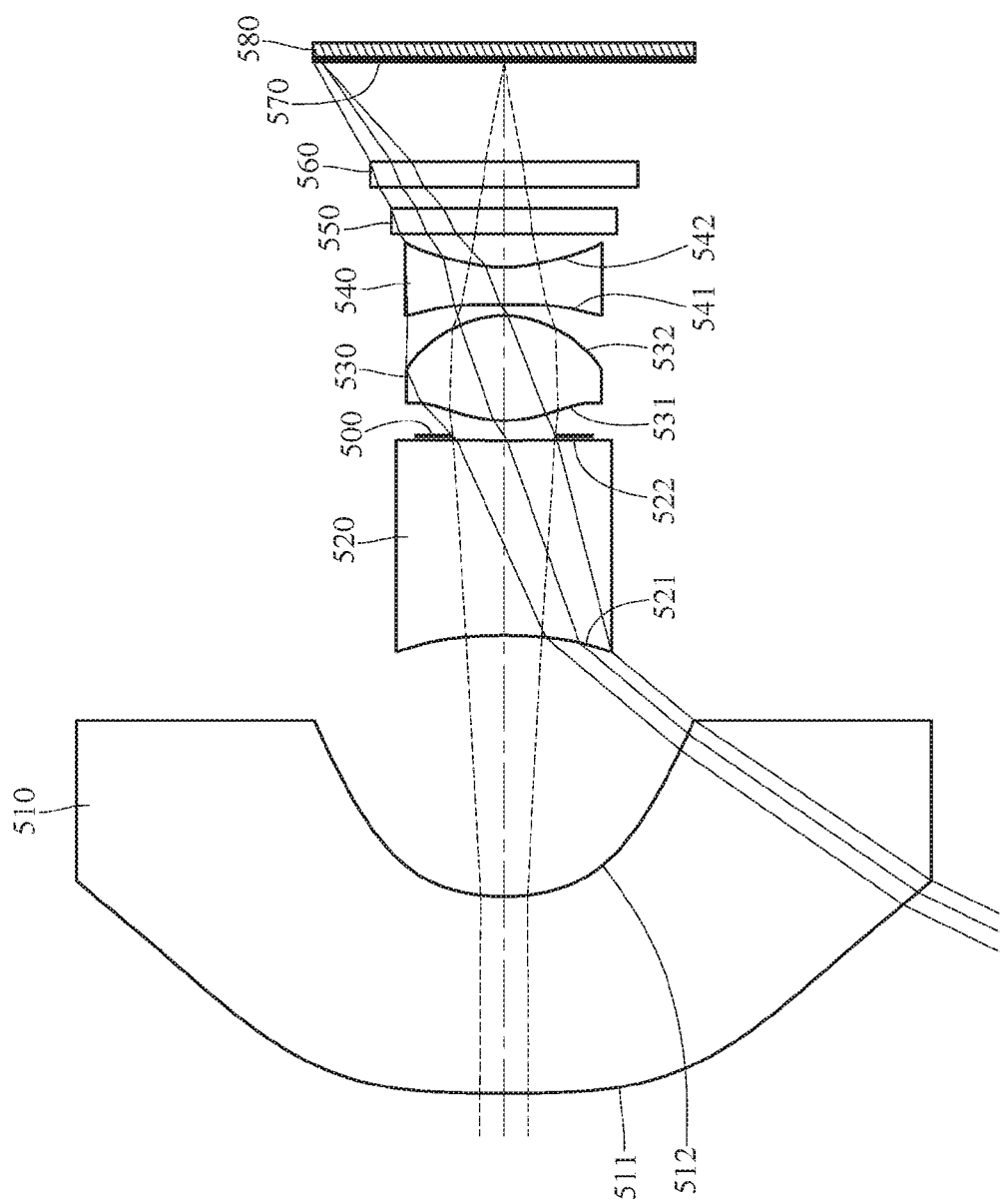
FIG. 9 is a schematic view of an image capturing unit according to the 5th embodiment of the present disclosure.
Figure 10:
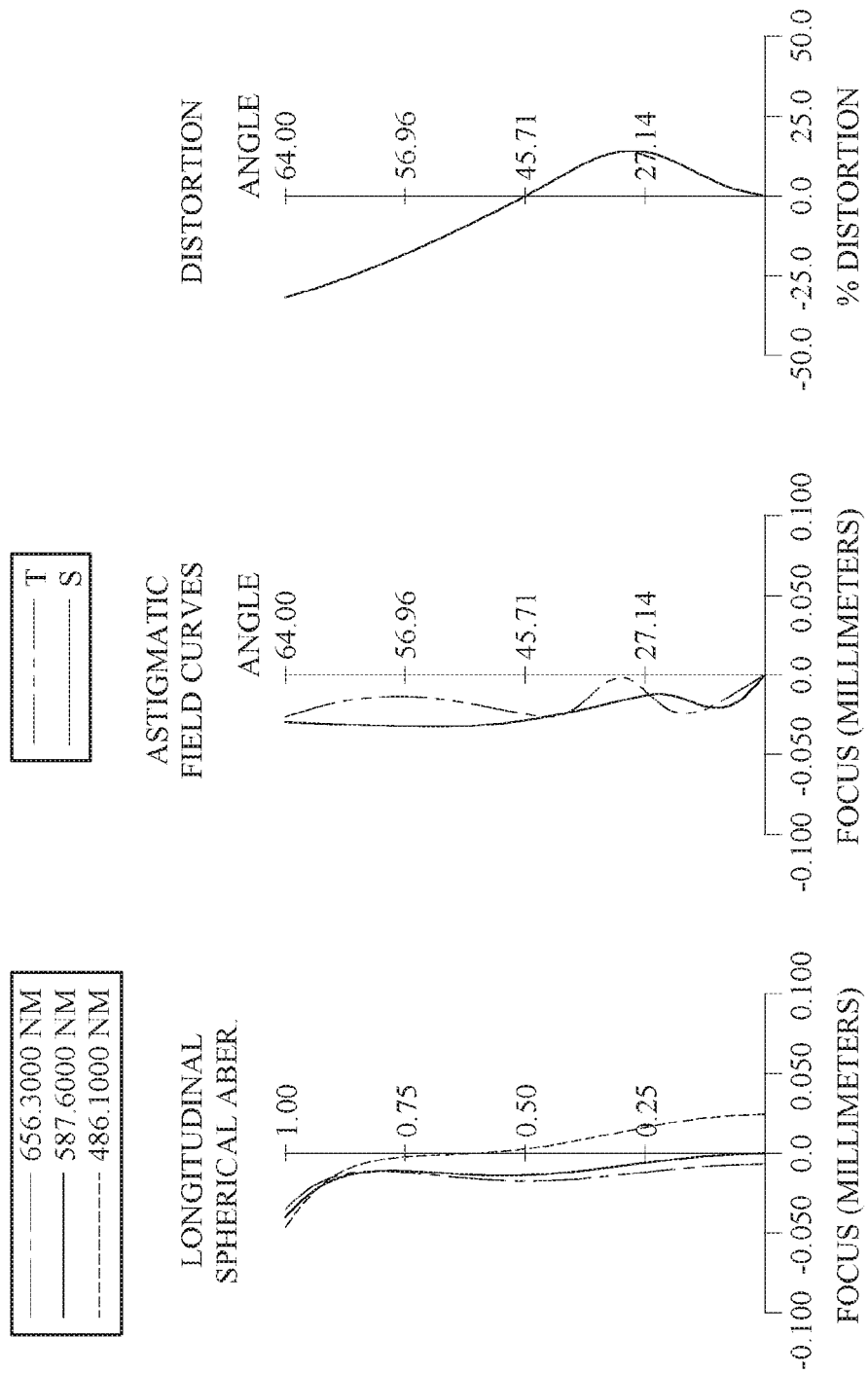
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens system (its reference numeral is omitted) of the present disclosure and an image sensor 580. The imaging lens system includes, in order from an object side to an image side, a first lens element 510, a second lens element 520, an aperture stop 500, a third lens element 530, a fourth lens element 540, an IR-cut filter 550, a cover glass 560 and an image surface 570, wherein the imaging lens system has a total of four single and non-cemented lens elements (510-540). A front lens group includes the first lens element 510 and the second lens element 520, and a rear lens group includes the third lens element 530 and the fourth lens element 540.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one inflection point.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one inflection point.

The IR-cut filter 550 and the cover glass 560 are made of glass material and located between the fourth lens element 540 and the image surface 570, and will not affect the focal length of the imaging lens system. The image sensor 580 is disposed on or near the image surface 570 of the imaging lens system.

The detailed optical data of the 5th embodiment are shown in Table 9 and the aspheric surface data are shown in Table 10 below.

TABLE 9

5th Embodiment
f = 1.54 mm, Fno = 2.70, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 28.462 | (ASP) | 2.322 | Plastic | 1.535 | 56.3 | −5.17 |
| 2 | | 2.447 | (ASP) | 3.077 | | | | |
| 3 | Lens 2 | −6.024 | (ASP) | 2.300 | Plastic | 1.660 | 20.4 | −5.44 |
| 4 | | 10.255 | (ASP) | 0.054 | | | | |
| 5 | Ape. Stop | Plano | | 0.181 | | | | |
| 6 | Lens 3 | 1.437 | (ASP) | 1.236 | Plastic | 1.535 | 56.3 | 1.44 |
| 7 | | −1.160 | (ASP) | 0.131 | | | | |
| 8 | Lens 4 | 139.354 | (ASP) | 0.438 | Plastic | 1.634 | 23.8 | −2.59 |
| 9 | | 1.620 | (ASP) | 0.400 | | | | |
| 10 | IR-cut filter | Plano | | 0.300 | Glass | 1.517 | 64.2 | — |
| 11 | | Plano | | 0.250 | | | | |
| 12 | Cover glass | Plano | | 0.300 | Glass | 1.517 | 64.2 | — |
| 13 | | Plano | | 1.174 | | | | |
| 14 | Image | Plano | | — | | | | |

Note:
Reference wavelength is 587.6 nm (d-line).

TABLE 10

Aspheric Coefficients

| Surface # | 1 | 2 | 3 | 4 |
|---|---|---|---|---|
| k = | −9.9000E+01 | −1.5373E+01 | −1.0000E+00 | 5.0000E+01 |
| A4 = | 1.3691E−02 | 1.2150E−01 | −2.9611E−02 | −1.5214E−01 |
| A6 = | −7.1669E−04 | −1.4282E−02 | −2.1722E−03 | 2.1564E−01 |
| A8 = | 1.4549E−05 | 6.0079E−04 | 4.8170E−03 | −1.2576E−01 |
| A10 = | −8.7905E−08 | — | −9.3341E−04 | 9.1042E−03 |

| Surface # | 6 | 7 | 8 | 9 |
|---|---|---|---|---|
| k = | −3.0050E+00 | −1.6778E+00 | 1.9139E+00 | −4.9937E+00 |
| A4 = | −9.4133E−02 | 1.7812E−02 | −1.4161E−01 | −8.6130E−02 |
| A6 = | 9.3188E−02 | −1.4595E−01 | −3.2957E−02 | 7.4401E−02 |
| A8 = | −8.7724E−02 | 1.3354E−01 | 1.0639E−01 | −2.0314E−02 |
| A10 = | — | −5.9867E−02 | −4.1755E−02 | 8.6216E−03 |
| A12 = | — | — | 6.8161E−03 | −1.4211E−03 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 1.54 | CT2/ΣCT | 0.37 |
|---|---|---|---|
| Fno | 2.70 | |Dr4s/Dr3s| | 0.02 |
| HFOV [deg.] | 64.0 | |Dr5s/Dr6s| | 0.13 |
| tan(HFOV) | 2.05 | R5/R4 | 0.14 |
| V4 | 23.8 | (R5 + R6)/(R5 − R6) | 0.11 |
| T23/T12 | 0.08 | (R7 + R8)/(R7 − R8) | 1.02 |
| T12/f | 1.99 | f4/f1 | 0.50 |
| CT2/T12 | 0.75 | ff/fr | −1.07 |
| CT2/CT1 | 0.99 | TL/f | 7.88 |
| CT3/CT2 | 0.54 | SL/TL | 0.36 |

6th Embodiment

Figure 11:
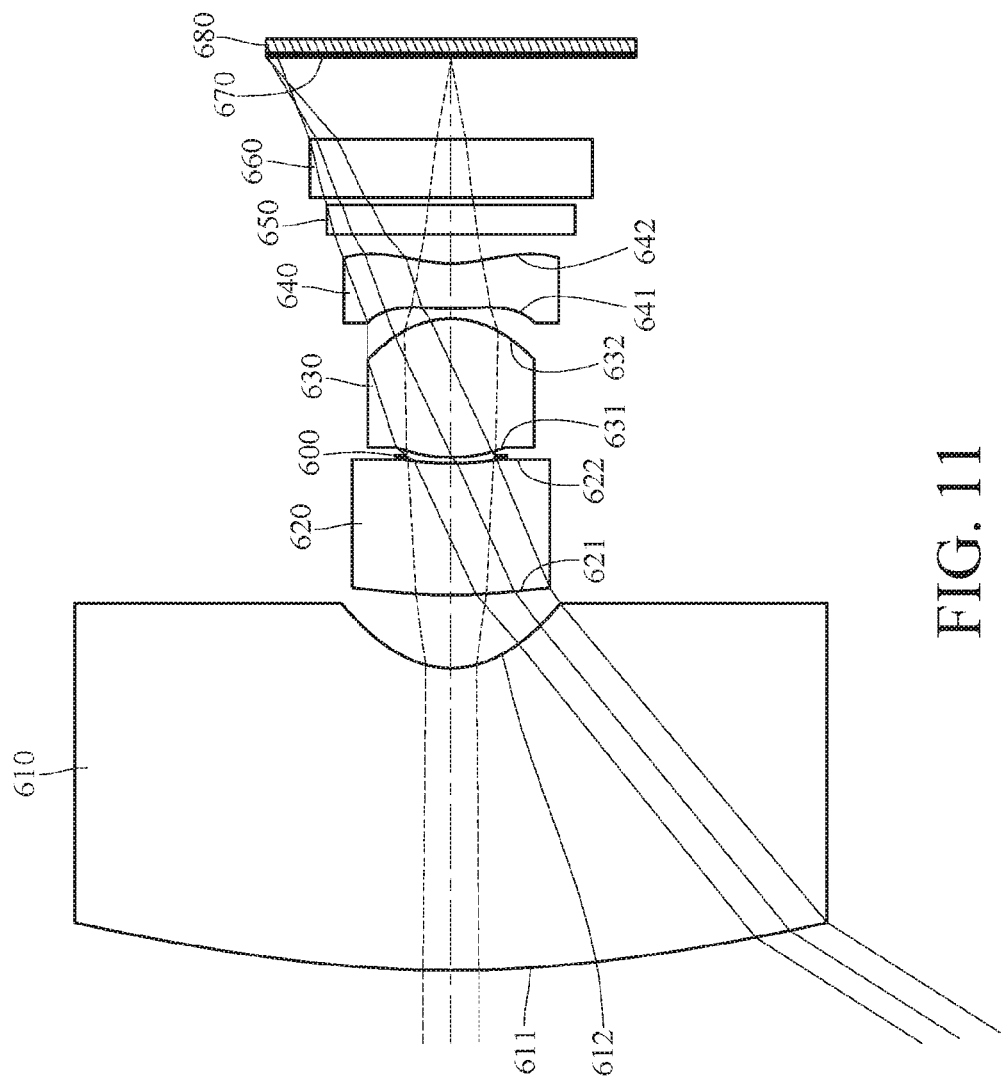
FIG. 11 is a schematic view of an image capturing unit according to the 6th embodiment of the present disclosure.
Figure 12:
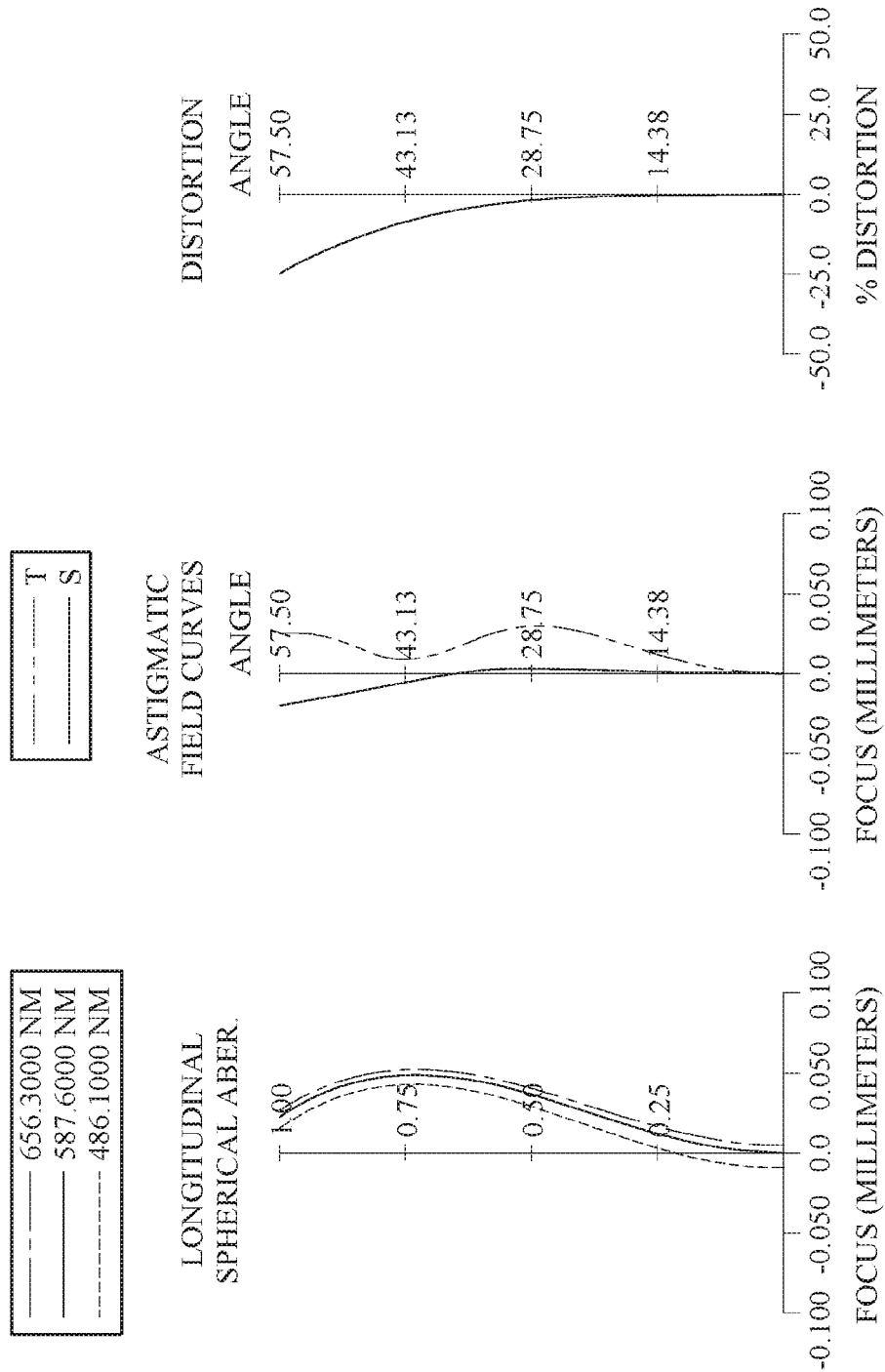
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens system (its reference numeral is omitted) of the present disclosure and an image sensor 680. The imaging lens system includes, in order from an object side to an image side, a first lens element 610, a second lens element 620, an aperture stop 600, a third lens element 630, a fourth lens element 640, an IR-cut filter 650, a cover glass 660 and an image surface 670, wherein the imaging lens system has a total of four single and non-cemented lens elements (610-640). A front lens group includes the first lens element 610 and the second lens element 620, and a rear lens group includes the third lens element 630 and the fourth lens element 640.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. Both the object-side surface 641 and the image-side surface 642 of the fourth lens element 640 have at least one inflection point.

The IR-cut filter 650 and the cover glass 660 are made of glass material and located between the fourth lens element 640 and the image surface 670, and will not affect the focal length of the imaging lens system. The image sensor 680 is disposed on or near the image surface 670 of the imaging lens system.

The detailed optical data of the 6th embodiment are shown in TABLE 11 and the aspheric surface data are shown in TABLE 12 below.

TABLE 11

6th Embodiment
f = 1.05 mm, Fno = 2.75, HFOV = 57.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.217 | (ASP) | 2.071 | Plastic | 1.544 | 55.9 | −1.42 |
| 2 | | 0.642 | (ASP) | 0.500 | | | | |
| 3 | Lens 2 | 2.974 | (ASP) | 0.905 | Plastic | 1.645 | 22.5 | −202.59 |
| 4 | | 2.560 | (ASP) | 0.050 | | | | |
| 5 | Ape. Stop | Plano | | −0.011 | | | | |
| 6 | Lens 3 | 1.003 | (ASP) | 0.951 | Plastic | 1.544 | 55.9 | 0.91 |
| 7 | | −0.652 | (ASP) | 0.070 | | | | |
| 8 | Lens 4 | 2.347 | (ASP) | 0.311 | Plastic | 1.632 | 23.4 | −2.86 |
| 9 | | 0.969 | (ASP) | 0.200 | | | | |
| 10 | IR-cut filter | Plano | | 0.200 | Glass | 1.517 | 64.2 | — |
| 11 | | Plano | | 0.050 | | | | |
| 12 | Cover glass | Plano | | 0.400 | Glass | 1.517 | 64.2 | — |
| 13 | | Plano | | 0.563 | | | | |
| 14 | Image | Plano | | — | | | | |

Note:
Reference wavelength is 587.6 nm (d-line).

TABLE 12

Aspheric Coefficients

| Surface # | 1 | 2 | 3 | 4 |
|---|---|---|---|---|
| k = | −1.0000E+00 | −1.0442E+00 | −5.5266E+01 | 3.4353E+01 |
| A4 = | −2.7258E−03 | −4.7566E−03 | — | — |
| A6 = | 1.4644E−04 | 2.4162E−02 | — | — |
| A8 = | — | 1.0853E−01 | — | — |

| Surface # | 6 | 7 | 8 | 9 |
|---|---|---|---|---|
| k = | −9.8792E+00 | −5.5052E−01 | −1.0000E+00 | −1.0000E+00 |
| A4 = | 8.9356E−01 | −5.2808E−01 | −1.8879E+00 | −1.4565E+00 |
| A6 = | −2.6770E+00 | 3.1453E+00 | 3.0078E+00 | 2.1929E+00 |
| A8 = | 7.2119E+00 | −8.6639E+00 | −5.5274E+00 | −2.6938E+00 |
| A10 = | −7.0487E+00 | 1.0678E+01 | −1.8428E+00 | 1.4169E+00 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.05 | CT2/ΣCT | 0.21 |
| Fno | 2.75 | |Dr4s/Dr3s| | 0.05 |
| HFOV [deg.] | 57.5 | |Dr5s/Dr6s| | 0.01 |
| tan(HFOV) | 1.57 | R5/R4 | 0.39 |
| V4 | 23.4 | (R5 + R6)/(R5 − R6) | 0.21 |
| T23/T12 | 0.08 | (R7 + R8)/(R7 − R8) | 2.41 |
| T12/f | 0.48 | f4/f1 | 2.02 |
| CT2/T12 | 1.81 | ff/fr | −1.27 |
| CT2/CT1 | 0.44 | TL/f | 5.95 |
| CT3/CT2 | 1.05 | SL/TL | 0.44 |

7th Embodiment

Figure 13:
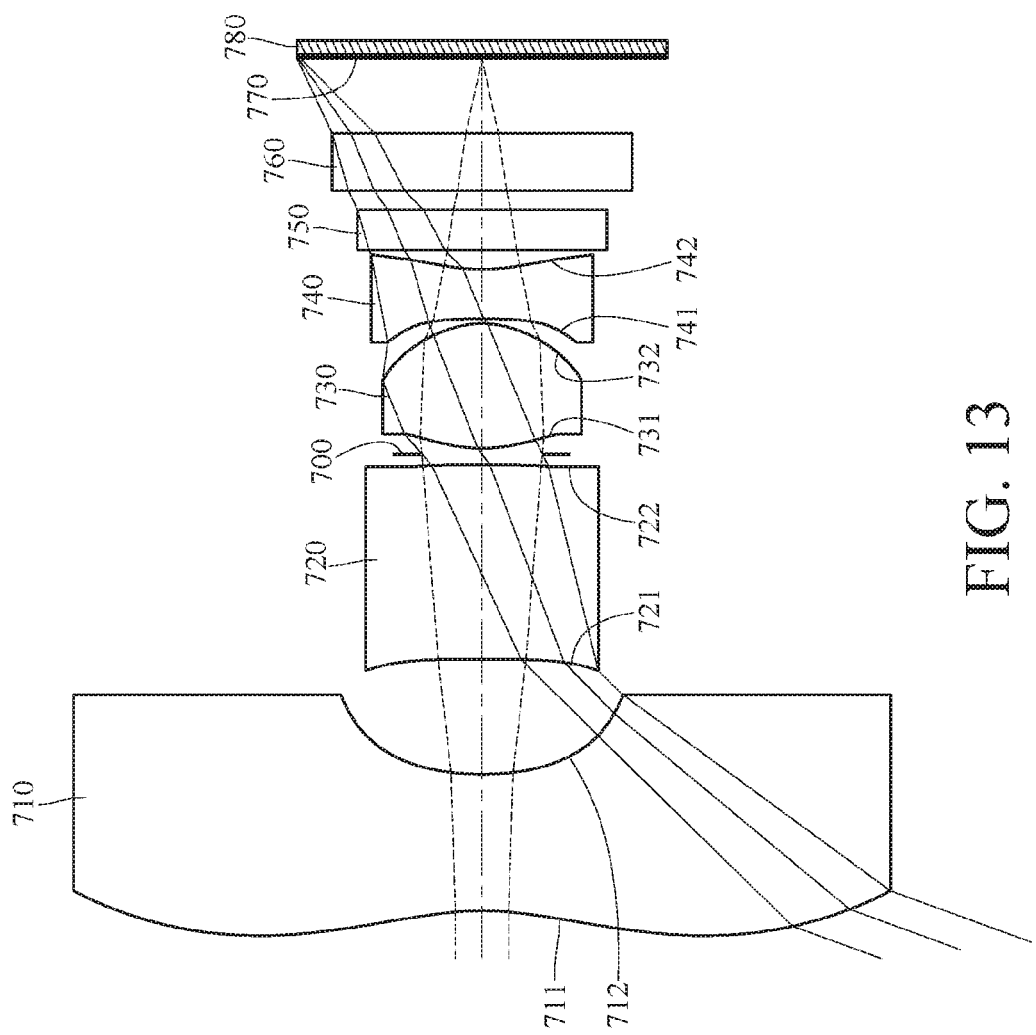
FIG. 13 is a schematic view of an image capturing unit according to the 7th embodiment of the present disclosure.
Figure 14:
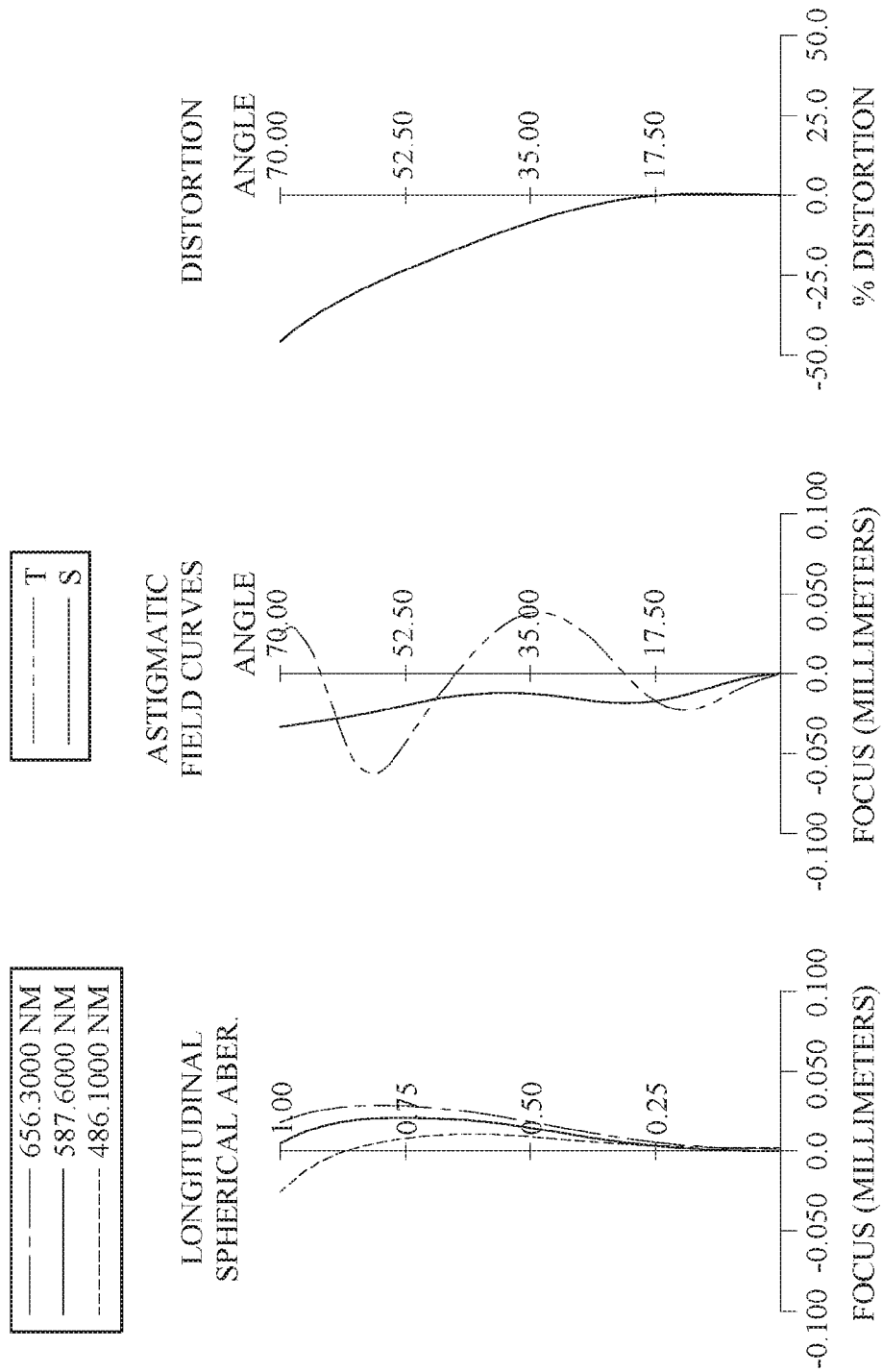
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens system (its reference numeral is omitted) of the present disclosure and an image sensor 780. The imaging lens system includes, in order from an object side to an image side, a first lens element 710, a second lens element 720, an aperture stop 700, a third lens element 730, a fourth lens element 740, an IR-cut filter 750, a cover glass 760 and an image surface 770, wherein the imaging lens system has a total of four single and non-cemented lens elements (710-740). A front lens group includes the first lens element 710 and the second lens element 720, and a rear lens group includes the third lens element 730 and the fourth lens element 740.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one inflection point.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric. Both the object-side surface 741 and the image-side surface 742 of the fourth lens element 740 have at least one inflection point.

The IR-cut filter 750 and the cover glass 760 are made of glass material and located between the fourth lens element 740 and the image surface 770, and will not affect the focal length of the imaging lens system. The image sensor 780 is disposed on or near the image surface 770 of the imaging lens system.

The detailed optical data of the 7th embodiment are shown in Table 13 and the aspheric surface data are shown in Table 14 below.

TABLE 13

7th Embodiment
f = 1.28 mm, Fno = 2.30, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.909 | (ASP) | 1.427 | Plastic | 1.544 | 56.0 | −2.49 |
| 2 | | 2.969 | (ASP) | 1.200 | | | | |
| 3 | Lens 2 | −97.794 | (ASP) | 2.030 | Plastic | 1.660 | 20.4 | −59.77 |
| 4 | | 66.667 | (ASP) | 0.113 | | | | |
| 5 | Ape. Stop | Plano | | 0.061 | | | | |
| 6 | Lens 3 | 1.496 | (ASP) | 1.302 | Plastic | 1.544 | 56.0 | 1.34 |
| 7 | | −0.979 | (ASP) | 0.050 | | | | |
| 8 | Lens 4 | −7.382 | (ASP) | 0.518 | Plastic | 1.634 | 23.8 | −2.24 |
| 9 | | 1.806 | (ASP) | 0.200 | | | | |
| 10 | IR-cut filter | Plano | | 0.420 | Glass | 1.517 | 64.2 | — |
| 11 | | Plano | | 0.200 | | | | |
| 12 | Cover glass | Plano | | 0.600 | Glass | 1.517 | 64.2 | — |
| 13 | | Plano | | 0.781 | | | | |
| 14 | Image | Plano | | — | | | | |

Note:
Reference wavelength is 587.6 nm (d-line).

TABLE 14

Aspheric Coefficients

| Surface # | 1 | 2 | 3 | 4 |
|---|---|---|---|---|
| k = | −1.9600E+01 | −1.5654E+01 | −5.0000E+01 | −5.0000E+01 |
| A4 = | 6.1328E−03 | 1.4001E−01 | −6.8074E−02 | −1.8940E−01 |
| A6 = | −2.4398E−04 | −5.5801E−02 | 3.4227E−02 | 3.2973E−01 |
| A8 = | 4.4748E−06 | 2.2855E−02 | −2.7197E−02 | −4.6041E−01 |
| A10 = | 1.8052E−09 | — | 7.8201E−03 | 3.7560E−01 |

| Surface # | 6 | 7 | 8 | 9 |
|---|---|---|---|---|
| k = | −5.0318E+00 | −1.7726E+00 | 4.5007E+01 | −1.1637E+01 |
| A4 = | −5.9360E−02 | 1.0376E−01 | −1.1807E−01 | −7.1008E−02 |
| A6 = | 1.4088E−01 | −3.5461E−01 | 2.0212E−02 | 4.6189E−02 |
| A8 = | −2.4250E−01 | 2.5767E−01 | −3.0734E−01 | −4.1066E−02 |
| A10 = | — | −1.0358E−01 | 2.4787E−01 | 1.8282E−02 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.28 | CT2/ΣCT | 0.38 |
| Fno | 2.30 | |Dr4s/Dr3s| | 0.05 |

-continued

| 7th Embodiment | | | |
|---|---|---|---|
| HFOV [deg.] | 70.0 | \|Dr5s/Dr6s\| | 0.04 |
| tan(HFOV) | 2.75 | R5/R4 | 0.02 |
| V4 | 23.8 | (R5 + R6)/(R5 − R6) | 0.21 |
| T23/T12 | 0.15 | (R7 + R8)/(R7 − R8) | 0.61 |
| T12/f | 0.94 | f4/f1 | 0.90 |
| CT2/T12 | 1.69 | ff/fr | −1.24 |
| CT2/CT1 | 1.42 | TL/f | 6.95 |
| CT3/CT2 | 0.64 | SL/TL | 0.46 |

8th Embodiment

Figure 15:
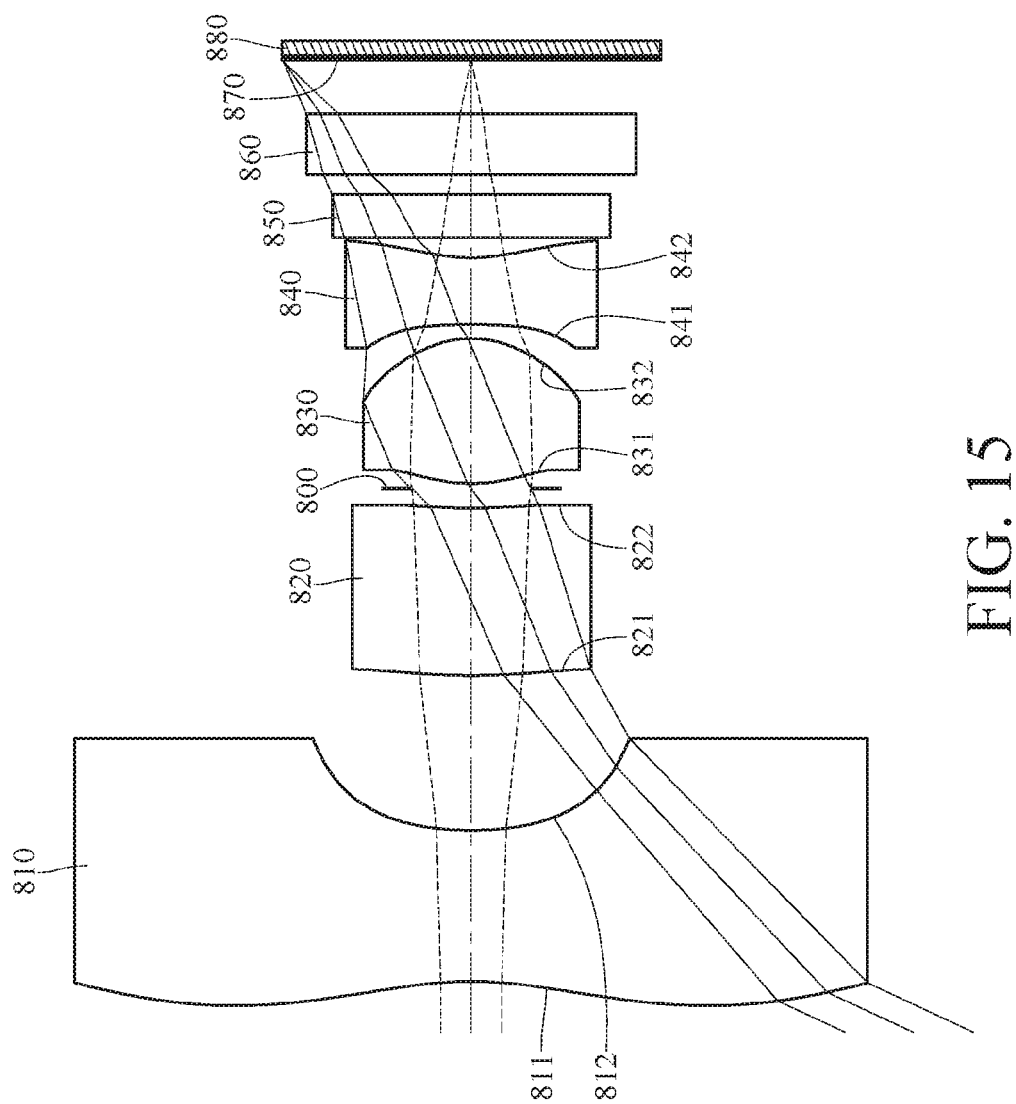
FIG. 15 is a schematic view of an image capturing unit according to the 8th embodiment of the present disclosure.
Figure 16:
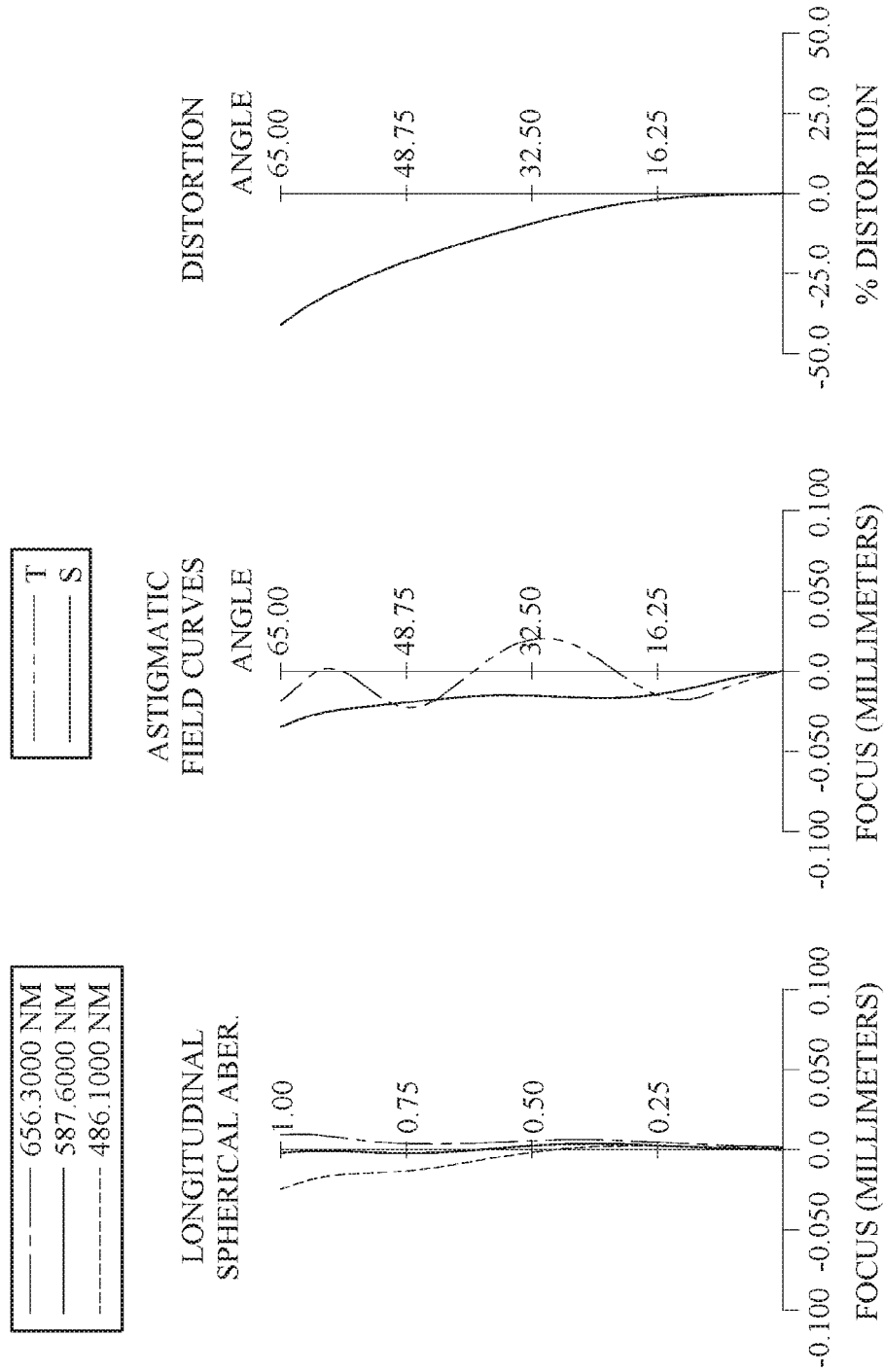
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens system (its reference numeral is omitted) of the present disclosure and an image sensor 880. The imaging lens system includes, in order from an object side to an image side, a first lens element 810, a second lens element 820, an aperture stop 800, a third lens element 830, a fourth lens element 840, an IR-cut filter 850, a cover glass 860 and an image surface 870, wherein the imaging lens system has a total of four single and non-cemented lens elements (810-840). A front lens group includes the first lens element 810 and the second lens element 820, and a rear lens group includes the third lens element 830 and the fourth lens element 840.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has at least one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric. Both the object-side surface 841 and the image-side surface 842 of the fourth lens element 840 have at least one inflection point.

The IR-cut filter 850 and the cover glass 860 are made of glass material and located between the fourth lens element 840 and the image surface 870, and will not affect the focal length of the imaging lens system. The image sensor 880 is disposed on or near the image surface 870 of the imaging lens system.

The detailed optical data of the 8th embodiment are shown in Table 15 and the aspheric surface data are shown in Table 16 below.

TABLE 15

8th Embodiment
f = 1.48 mm, Fno = 2.45, HFOV = 65.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.582 | (ASP) | 1.490 | Plastic | 1.544 | 56.0 | −2.86 |
| 2 | | 3.160 | (ASP) | 1.527 | | | | |
| 3 | Lens 2 | 5.714 | (ASP) | 1.650 | Plastic | 1.660 | 20.4 | −73.90 |
| 4 | | 4.528 | (ASP) | 0.194 | | | | |
| 5 | Ape. Stop | Plano | | 0.051 | | | | |
| 6 | Lens 3 | 1.550 | (ASP) | 1.430 | Plastic | 1.544 | 56.0 | 1.36 |
| 7 | | −0.958 | (ASP) | 0.136 | | | | |
| 8 | Lens 4 | −8.122 | (ASP) | 0.660 | Plastic | 1.634 | 23.8 | −2.07 |
| 9 | | 1.619 | (ASP) | 0.200 | | | | |
| 10 | IR-cut filter | Plano | | 0.420 | Glass | 1.517 | 64.2 | — |
| 11 | | Plano | | 0.200 | | | | |
| 12 | Cover glass | Plano | | 0.600 | Glass | 1.517 | 64.2 | — |
| 13 | | Plano | | 0.531 | | | | |
| 14 | Image | Plano | | — | | | | |

Note:
Reference wavelength is 587.6 nm (d-line).

TABLE 16

Aspheric Coefficients

| Surface # | 1 | 2 | 3 | 4 |
|---|---|---|---|---|
| k = | −1.7615E+01 | −1.7761E+01 | 6.0782E+00 | 3.3633E+01 |
| A4 = | 7.1822E−03 | 1.1749E−01 | −4.2216E−02 | −1.8851E−01 |

TABLE 16-continued

| Aspheric Coefficients | | | | |
|---|---|---|---|---|
| A6 = | −4.0190E−04 | −3.3939E−02 | 8.4955E−03 | 7.2350E−02 |
| A8 = | 1.1968E−05 | 1.3192E−02 | −3.6409E−03 | 9.3200E−02 |
| A10 = | −1.7010E−07 | — | 3.8131E−04 | −3.8437E−01 |

| Surface # | 6 | 7 | 8 | 9 |
|---|---|---|---|---|
| k = | −4.7560E+00 | −1.4703E+00 | 5.0000E+01 | −1.1659E+01 |
| A4 = | −4.5065E−02 | 6.0007E−02 | −1.6626E−01 | −7.1539E−02 |
| A6 = | 3.0156E−02 | −1.3770E−01 | 1.9440E−01 | 4.9359E−02 |
| A8 = | −1.3613E−01 | 4.5753E−02 | −3.4025E−01 | −3.5029E−02 |
| A10 = | — | −2.4734E−02 | 1.8440E−01 | 1.1451E−02 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.48 | CT2/ΣCT | 0.32 |
| Fno | 2.45 | |Dr4s/Dr3s| | 0.11 |
| HFOV [deg.] | 65.0 | |Dr5s/Dr6s| | 0.03 |
| tan(HFOV) | 2.14 | R5/R4 | 0.34 |
| V4 | 23.8 | (R5 + R6)/(R5 − R6) | 0.24 |
| T23/T12 | 0.16 | (R7 + R8)/(R7 − R8) | 0.67 |
| T12/f | 1.03 | f4/f1 | 0.72 |
| CT2/T12 | 1.08 | ff/fr | −1.36 |
| CT2/CT1 | 1.11 | TL/f | 6.16 |
| CT3/CT2 | 0.87 | SL/TL | 0.47 |

9th Embodiment

Figure 17:
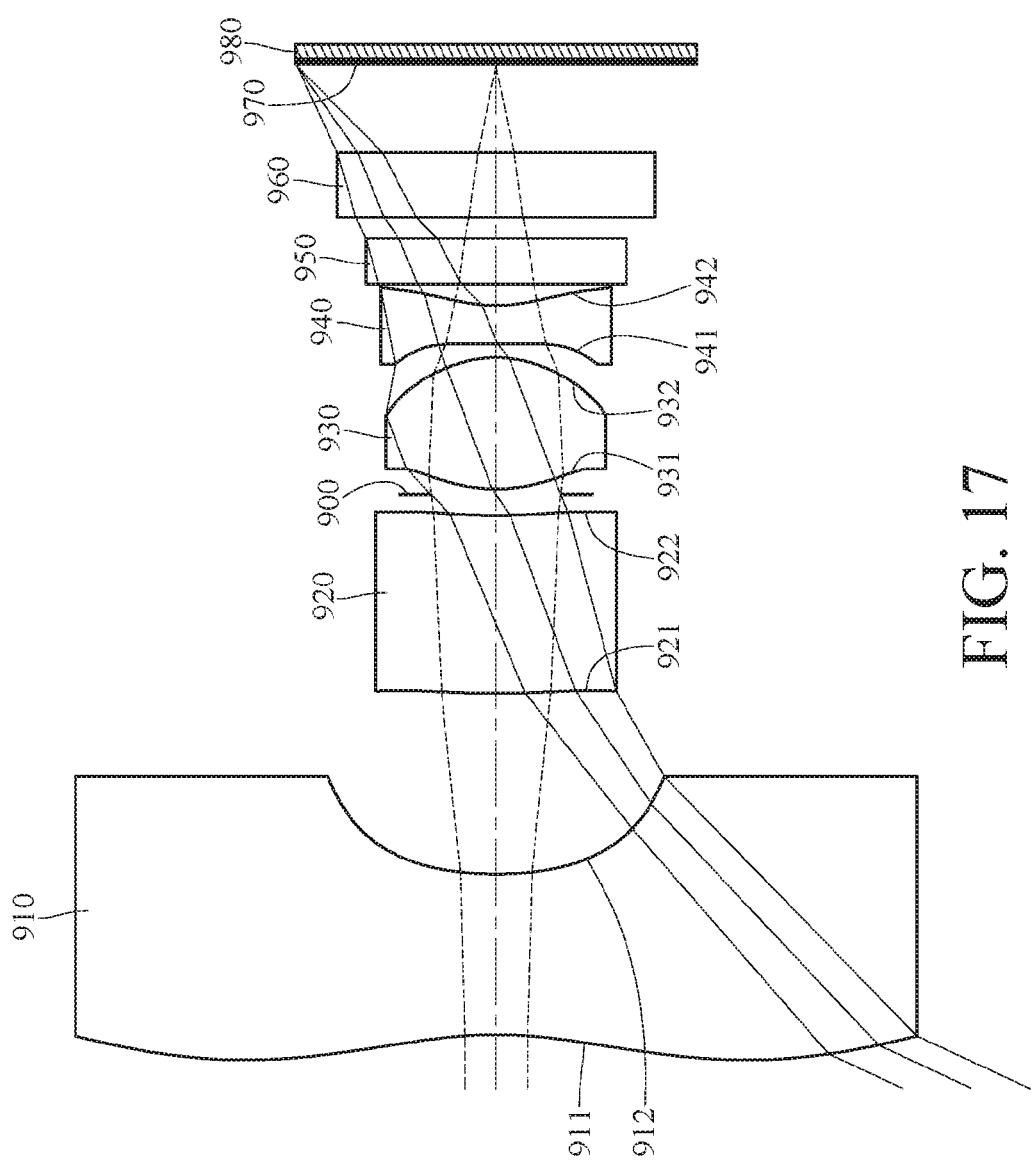
FIG. 17 is a schematic view of an image capturing unit according to the 9th embodiment of the present disclosure.
Figure 18:
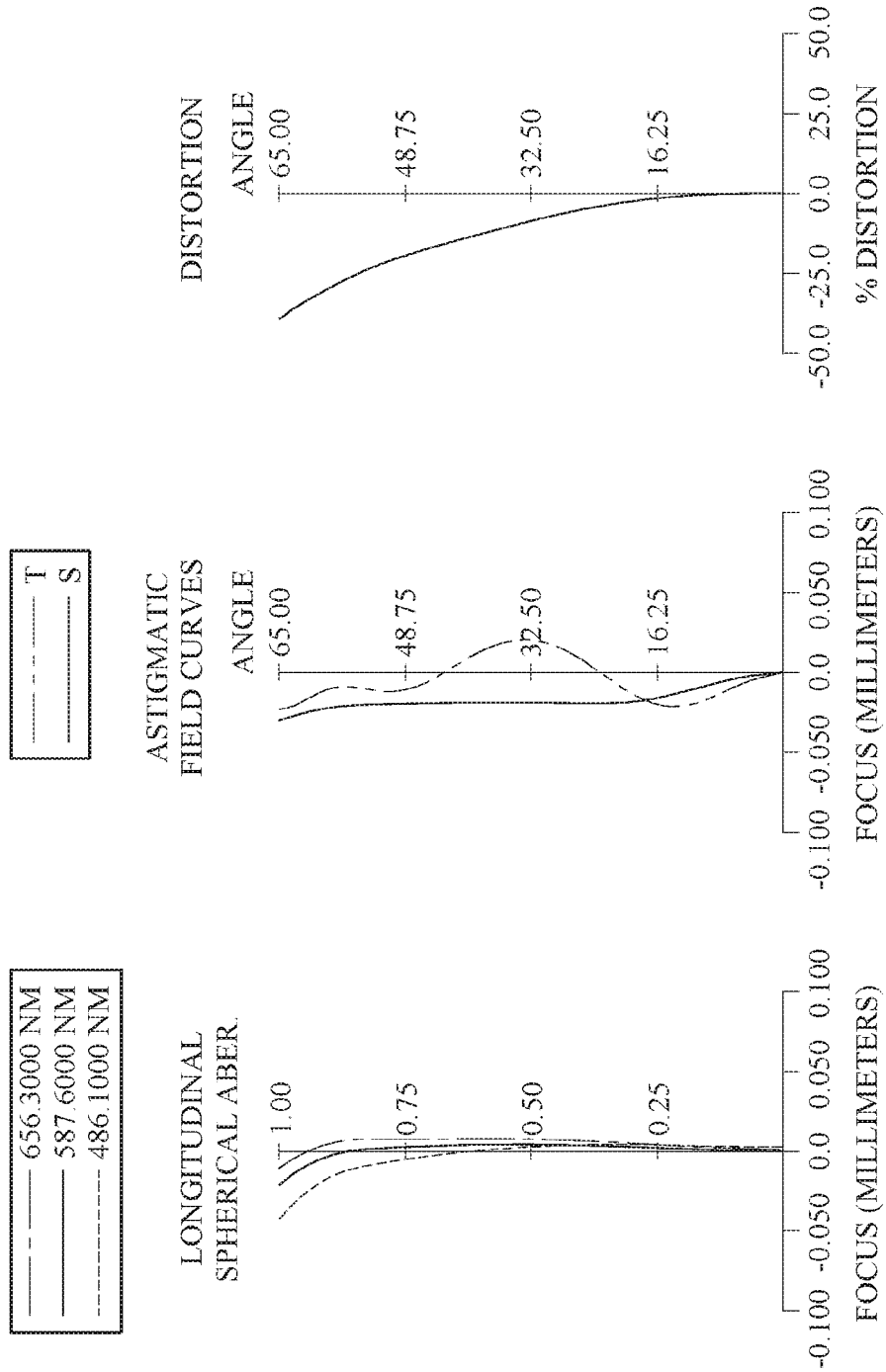
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens system (its reference numeral is omitted) of the present disclosure and an image sensor 980. The imaging lens system includes, in order from an object side to an image side, a first lens element 910, a second lens element 920, an aperture stop 900, a third lens element 930, a fourth lens element 940, an IR-cut filter 950, a cover glass 960 and an image surface 970, wherein the imaging lens system has a total of four single and non-cemented lens elements (910-940). A front lens group includes the first lens element 910 and the second lens element 920, and a rear lens group includes the third lens element 930 and the fourth lens element 940.

The first lens element 910 with negative refractive power has an object-side surface 911 being concave in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has at least one inflection point.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. Both the object-side surface 941 and the image-side surface 942 of the fourth lens element 940 have at least one inflection point.

The IR-cut filter 950 and the cover glass 960 are made of glass material and located between the fourth lens element 940 and the image surface 970, and will not affect the focal length of the imaging lens system. The image sensor 980 is disposed on or near the image surface 970 of the imaging lens system.

The detailed optical data of the 9th embodiment are shown in Table 17 and the aspheric surface data are shown in Table 18 below.

TABLE 17

9th Embodiment
f = 1.43 mm, Fno = 2.45, HFOV = 65.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.662 | (ASP) | 1.490 | Plastic | 1.544 | 56.0 | −2.86 |
| 2 | | 3.101 | (ASP) | 1.678 | | | | |

TABLE 17-continued

9th Embodiment
f = 1.43 mm, Fno = 2.45, HFOV = 65.0 deg.

| Surface # | | Curvature Radius | | Thickness | Material | Index | Abbe # | Focal Length |
|---|---|---|---|---|---|---|---|---|
| 3 | Lens 2 | 7.715 | (ASP) | 1.650 | Plastic | 1.660 | 20.4 | −21.14 |
| 4 | | 4.545 | (ASP) | 0.194 | | | | |
| 5 | Ape. Stop | Plano | | 0.051 | | | | |
| 6 | Lens 3 | 1.369 | (ASP) | 1.220 | Plastic | 1.544 | 56.0 | 1.33 |
| 7 | | −1.054 | (ASP) | 0.129 | | | | |
| 8 | Lens 4 | 8.333 | (ASP) | 0.354 | Plastic | 1.634 | 23.8 | −2.35 |
| 9 | | 1.241 | (ASP) | 0.200 | | | | |
| 10 | IR-cut filter | Plano | | 0.420 | Glass | 1.517 | 64.2 | — |
| 11 | | Plano | | 0.200 | | | | |
| 12 | Cover glass | Plano | | 0.600 | Glass | 1.517 | 64.2 | — |
| 13 | | Plano | | 0.822 | | | | |
| 14 | Image | Plano | | — | | | | |

Note:
Reference wavelength is 587.6 nm (d-line).

TABLE 18

Aspheric Coefficients

| Surface # | 1 | 2 | 3 | 4 |
|---|---|---|---|---|
| k = | −1.7615E+01 | −1.7761E+01 | −2.3509E−01 | 3.4380E+01 |
| A4 = | 7.1822E−03 | 1.1697E−01 | −4.6613E−02 | −1.8422E−01 |
| A6 = | −4.0190E−04 | −3.3700E−02 | 1.8186E−02 | 9.1967E−02 |
| A8 = | 1.1968E−05 | 1.3192E−02 | −1.5037E−02 | 3.9670E−02 |
| A10 = | −1.7010E−07 | — | 3.8880E−03 | −3.4326E−01 |

| Surface # | 6 | 7 | 8 | 9 |
|---|---|---|---|---|
| k = | −2.0382E+00 | −1.4371E+00 | −4.8452E+01 | −8.9530E+00 |
| A4 = | −8.8644E−02 | 1.0080E−01 | −3.7871E−01 | −1.0106E−01 |
| A6 = | 1.1529E−01 | −2.4550E−01 | 3.6087E−01 | 2.6459E−02 |
| A8 = | −1.7692E−01 | 1.5410E−01 | −6.6833E−01 | −1.4171E−02 |
| A10 = | — | −8.2296E−02 | 3.9683E−01 | 1.5614E−02 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.43 | CT2/ΣCT | 0.35 |
| Fno | 2.45 | |Dr4s/Dr3s| | 0.11 |
| HFOV [deg.] | 65.0 | |Dr5s/Dr6s| | 0.04 |
| tan(HFOV) | 2.14 | R5/R4 | 0.30 |
| V4 | 23.8 | (R5 + R6)/(R5 − R6) | 0.13 |
| T23/T12 | 0.15 | (R7 + R8)/(R7 − R8) | 1.35 |
| T12/f | 1.17 | f4/f1 | 0.82 |
| CT2/T12 | 0.98 | ff/fr | −1.21 |
| CT2/CT1 | 1.11 | TL/f | 6.30 |
| CT3/CT2 | 0.74 | SL/TL | 0.44 |

10th Embodiment

Figure 19:
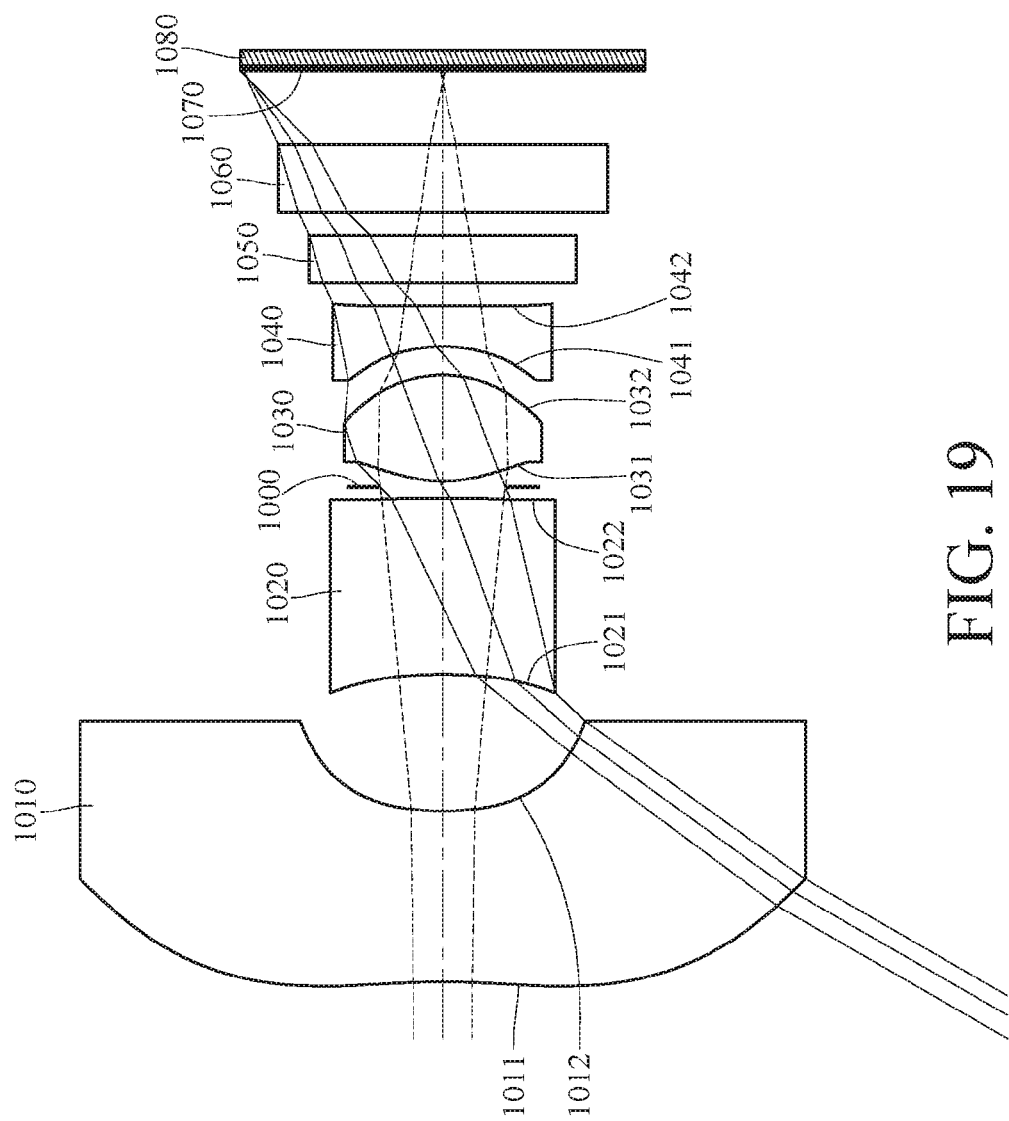
FIG. 19 is a schematic view of an image capturing unit according to the 10th embodiment of the present disclosure.
Figure 20:
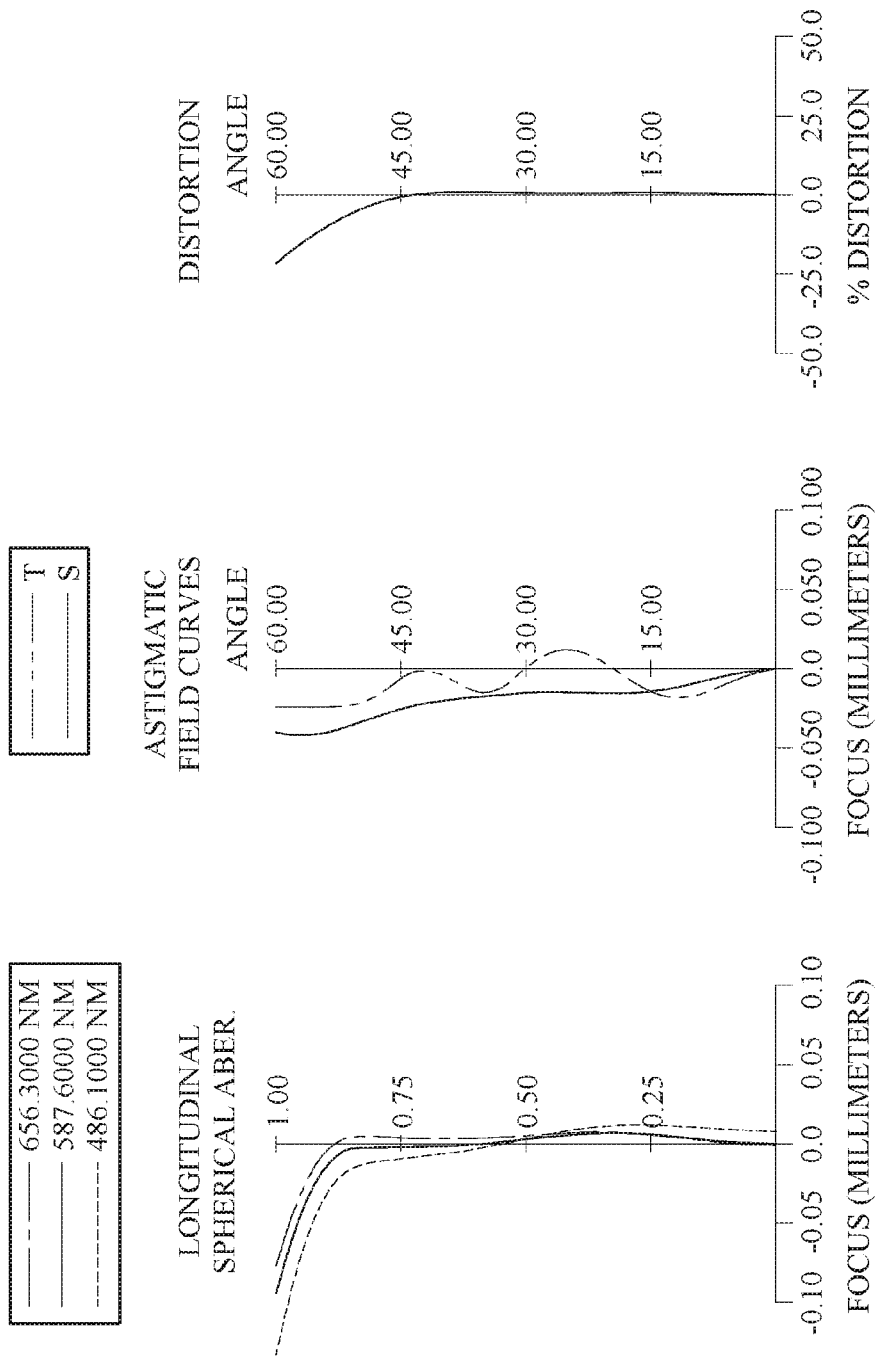
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging lens system (its reference numeral is omitted) of the present disclosure and an image sensor 1080. The imaging lens system includes, in order from an object side to an image side, a first lens element 1010, a second lens element 1020, an aperture stop 1000, a third lens element 1030, a fourth lens element 1040, an IR-cut filter 1050, a cover glass 1060 and an image surface 1070, wherein the imaging lens system has a total of four single and non-cemented lens elements (1010-1040). A front lens group includes the first lens element 1010 and the second lens element 1020, and a rear lens group includes the third lens element 1030 and the fourth lens element 1040.

The first lens element 1010 with negative refractive power has an object-side surface 1011 being concave in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has at least one inflection point.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with negative refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. Both the object-side surface 1041 and the image-side surface 1042 of the fourth lens element 1040 have at least one inflection point.

The IR-cut filter 1050 and the cover glass 1060 are made of glass material and located between the fourth lens element 1040 and the image surface 1070, and will not affect the focal length of the imaging lens system. The image sensor 1080 is disposed on or near the image surface 1070 of the imaging lens system.

The detailed optical data of the 10th embodiment are shown in Table 19 and the aspheric surface data are shown in Table 20 below.

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.29 | CT2/ΣCT | 0.36 |
| Fno | 2.50 | |Dr4s/Dr3s| | 0.06 |
| HFOV [deg.] | 60.0 | |Dr5s/Dr6s| | 0.05 |
| tan(HFOV) | 1.73 | R5/R4 | 0.02 |
| V4 | 23.8 | (R5 + R6)/(R5 − R6) | 0.08 |
| T23/T12 | 0.12 | (R7 + R8)/(R7 − R8) | −1.07 |
| T12/f | 0.93 | f4/f1 | 0.77 |
| CT2/T12 | 1.29 | ff/fr | −1.12 |
| CT2/CT1 | 1.03 | TL/f | 6.20 |
| CT3/CT2 | 0.60 | SL/TL | 0.46 |

TABLE 19

10th Embodiment
f = 1.29 mm, Fno = 2.50, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.851 | (ASP) | 1.500 | Plastic | 1.544 | 56.0 | −2.96 |
| 2 | | 2.425 | (ASP) | 1.200 | | | | |
| 3 | Lens 2 | −4.584 | (ASP) | 1.550 | Plastic | 1.660 | 20.4 | −6.44 |
| 4 | | 66.667 | (ASP) | 0.099 | | | | |
| 5 | Ape. Stop | Plano | | 0.050 | | | | |
| 6 | Lens 3 | 1.160 | (ASP) | 0.936 | Plastic | 1.544 | 56.0 | 1.16 |
| 7 | | −0.982 | (ASP) | 0.247 | | | | |
| 8 | Lens 4 | −1.387 | (ASP) | 0.360 | Plastic | 1.634 | 23.8 | −2.28 |
| 9 | | −38.462 | (ASP) | 0.200 | | | | |
| 10 | IR-cut filter | Plano | | 0.420 | Glass | 1.517 | 64.2 | — |
| 11 | | Plano | | 0.200 | | | | |
| 12 | Cover glass | Plano | | 0.600 | Glass | 1.517 | 64.2 | — |
| 13 | | Plano | | 0.647 | | | | |
| 14 | Image | Plano | | — | | | | |

Note:
Reference wavelength is 587.6 nm (d-line).

TABLE 20

| Aspheric Coefficients | | | | |
|---|---|---|---|---|
| Surface # | 1 | 2 | 3 | 4 |
| k = | −8.1535E+01 | −1.7744E+01 | −2.1780E+00 | 4.9989E+01 |
| A4 = | 2.4165E−02 | 2.4697E−01 | −7.9838E−02 | −3.3325E−01 |
| A6 = | −2.7022E−03 | −8.1130E−02 | −6.6480E−05 | 9.3584E−01 |
| A8 = | 2.2949E−04 | 4.9428E−02 | 3.1658E−02 | −1.1009E+00 |
| A10 = | −8.3966E−06 | — | −9.5796E−03 | 8.9239E−01 |
| Surface # | 6 | 7 | 8 | 9 |
| k = | −8.4148E+00 | −1.3145E+00 | 1.1859E+00 | −5.0000E+01 |
| A4 = | 1.4865E−01 | −3.9190E−03 | 1.1165E−01 | 9.0842E−02 |
| A6 = | −2.4347E−01 | −2.2059E−01 | −2.6743E−01 | −1.7255E−01 |
| A8 = | 5.1971E−02 | 1.3527E−01 | −1.2466E−01 | 1.4083E−01 |
| A10 = | — | −6.6995E−02 | 6.6280E−01 | −2.1710E−02 |

11th Embodiment

Figure 21:
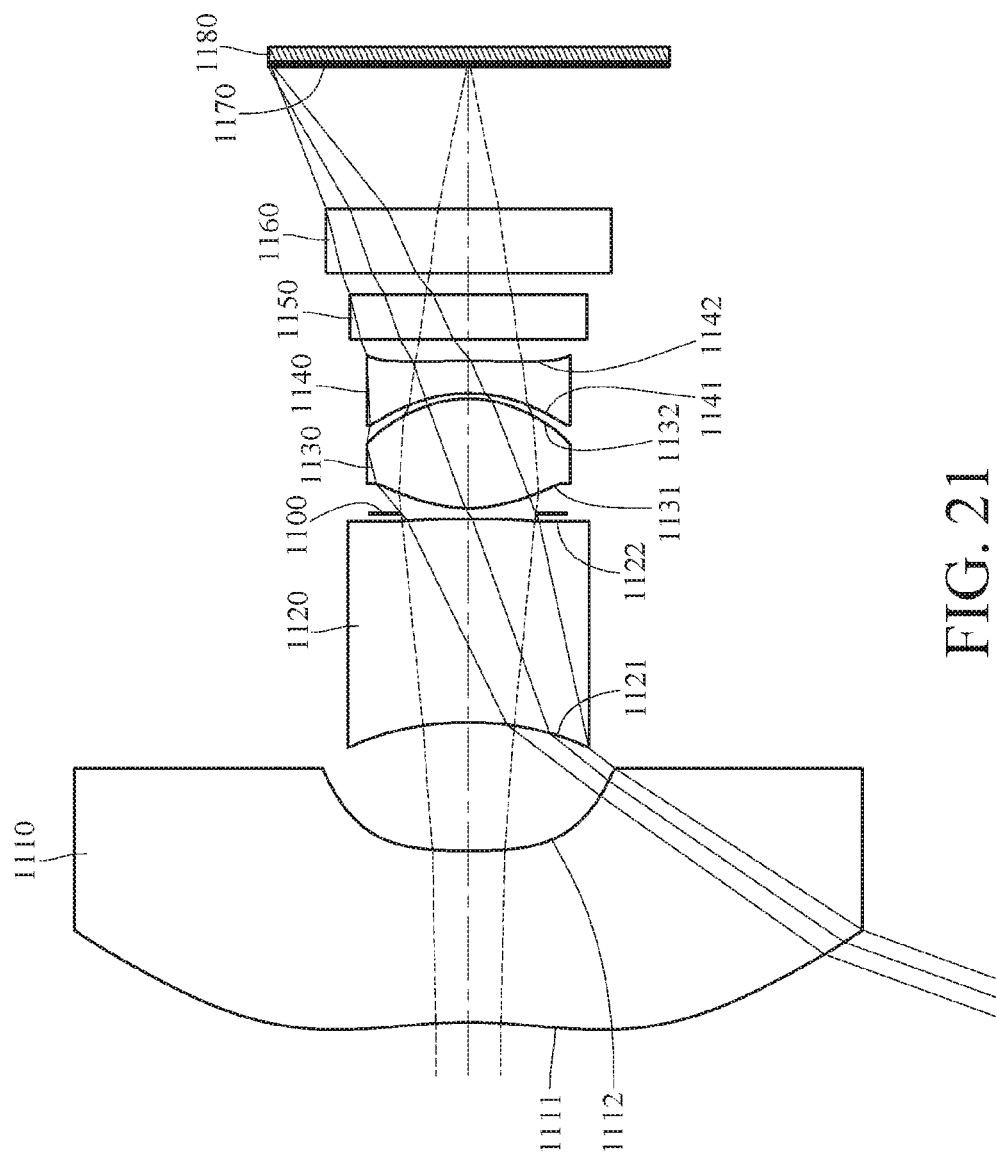
FIG. 21 is a schematic view of an image capturing unit according to the 11th embodiment of the present disclosure.
Figure 22:
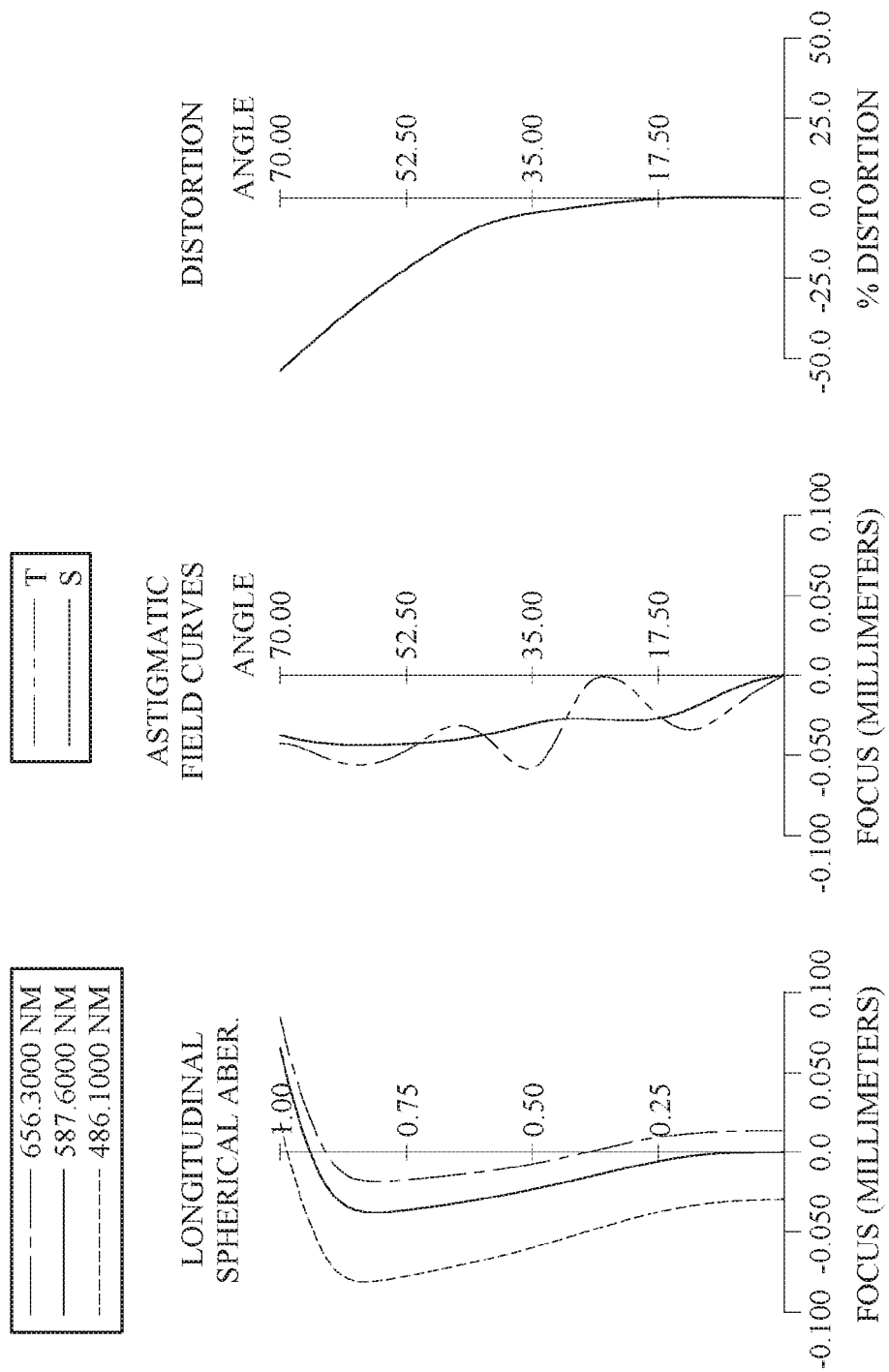
FIG. 22 shows spherical aberration curves, astigmatic field curves and a distortion curve of the image capturing unit according to the 11th embodiment.
Figure 23:
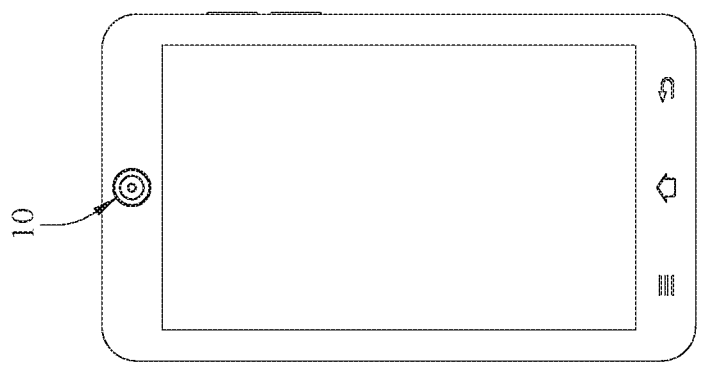
FIG. 23 shows an electronic device according to one embodiment.
Figure 24:
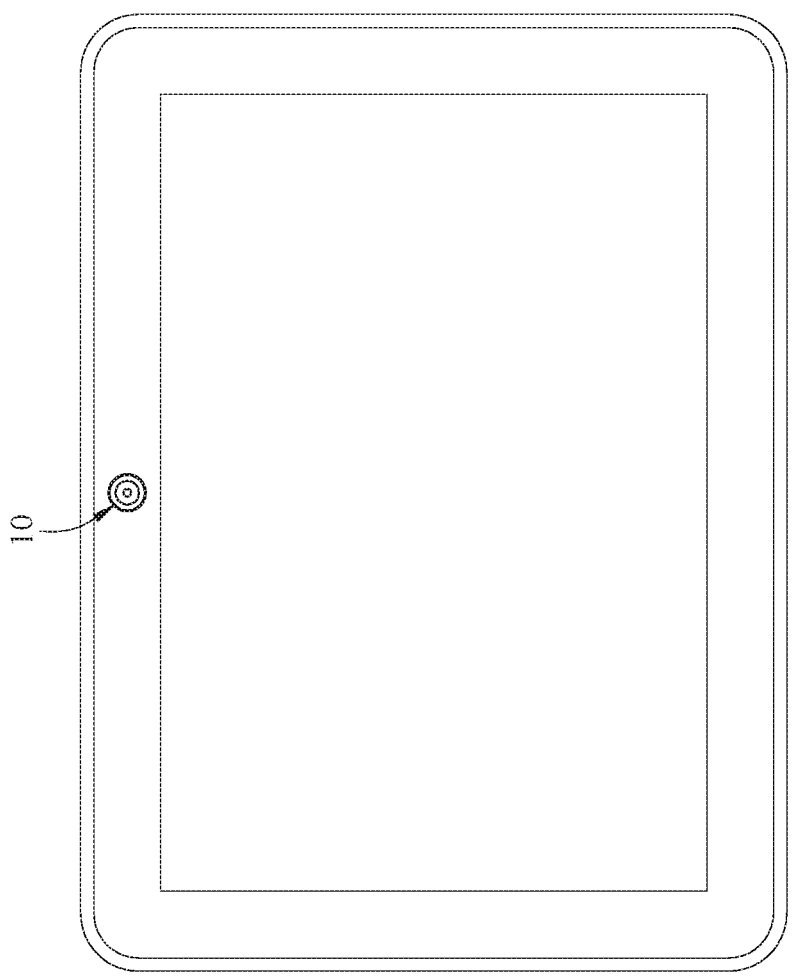
FIG. 24 shows an electronic device according to another embodiment.
Figure 25:
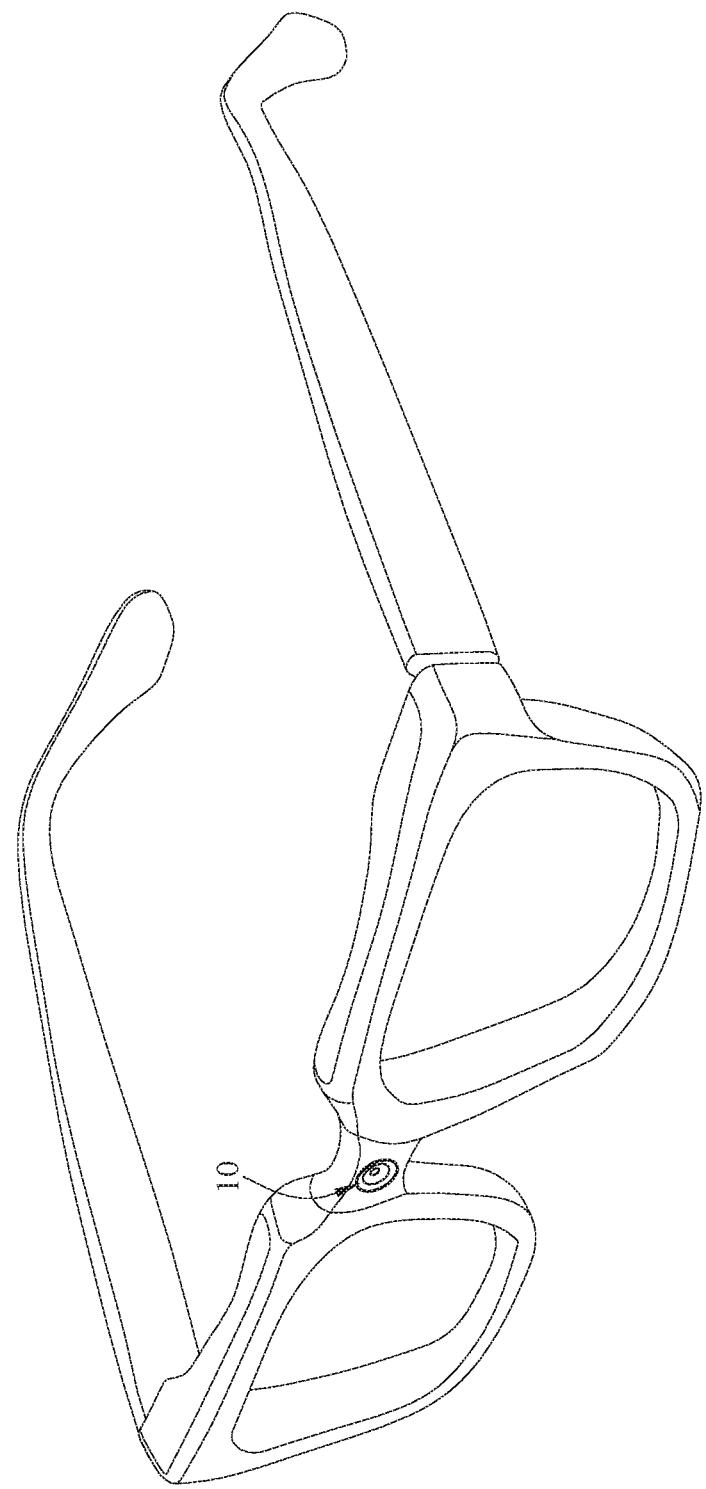
FIG. 25 shows an electronic device according to still another embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging lens system (its reference numeral is omitted) of the present disclosure and an image sensor 1180. The imaging lens system includes, in order from an object side to an image side, a first lens element 1110, a second lens element 1120, an aperture stop 1100, a third lens element 1130, a fourth lens element 1140, an IR-cut filter 1150, a cover glass 1160 and an image surface 1170, wherein the imaging lens system has a total of four single and non-cemented lens elements (1110-1140). A front lens group includes the first lens element 1110 and the second lens element 1120, and a rear lens group includes the third lens element 1130 and the fourth lens element 1140.

The first lens element 1110 with negative refractive power has an object-side surface 1111 being concave in a paraxial region thereof and an image-side surface 1112 being concave in a paraxial region thereof. The first lens element 1110 is made of plastic material and has the object-side surface 1111 and the image-side surface 1112 being both aspheric. The object-side surface 1111 of the first lens element 1110 has at least one inflection point.

The second lens element 1120 with negative refractive power has an object-side surface 1121 being concave in a paraxial region thereof and an image-side surface 1122 being convex in a paraxial region thereof. The second lens element 1120 is made of plastic material and has the object-side surface 1121 and the image-side surface 1122 being both aspheric.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric.

The fourth lens element 1140 with negative refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric. Both the object-side surface 1141 and the image-side surface 1142 of the fourth lens element 1140 have at least one inflection point.

The IR-cut filter 1150 and the cover glass 1160 are made of glass material and located between the fourth lens element 1140 and the image surface 1170, and will not affect the focal length of the imaging lens system. The image sensor 1180 is disposed on or near the image surface 1170 of the imaging lens system.

The detailed optical data of the 11th embodiment are shown in Table 21 and the aspheric surface data are shown in Table 22 below.

TABLE 21

11th Embodiment
f = 1.49 mm, Fno = 2.45, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.454 | (ASP) | 1.600 | Plastic | 1.544 | 56.0 | −4.38 |
| 2 | | 5.784 | (ASP) | 1.200 | | | | |
| 3 | Lens 2 | −2.769 | (ASP) | 1.900 | Plastic | 1.583 | 30.2 | −5.32 |
| 4 | | −32.258 | (ASP) | 0.050 | | | | |
| 5 | Ape. Stop | Plano | | 0.050 | | | | |
| 6 | Lens 3 | 1.277 | (ASP) | 1.020 | Plastic | 1.544 | 56.0 | 1.31 |
| 7 | | −1.150 | (ASP) | 0.050 | | | | |
| 8 | Lens 4 | −1.541 | (ASP) | 0.300 | Plastic | 1.535 | 55.8 | −3.02 |
| 9 | | −36.673 | (ASP) | 0.200 | | | | |
| 10 | IR-cut filter | Plano | | 0.420 | Glass | 1.517 | 64.2 | — |
| 11 | | Plano | | 0.200 | | | | |
| 12 | Cover glass | Plano | | 0.600 | Glass | 1.517 | 64.2 | — |
| 13 | | Plano | | 1.327 | | | | |
| 14 | Image | Plano | | — | | | | |

Note:
Reference wavelength is 587.6 nm (d-line).

TABLE 22

Aspheric Coefficients

| Surface # | 1 | 2 | 3 | 4 |
|---|---|---|---|---|
| k = | −4.2808E+01 | −1.9280E+01 | −7.6175E+00 | 7.4378E+00 |
| A4 = | 2.1378E−02 | 1.3585E−01 | 1.2691E−02 | −3.4571E−01 |
| A6 = | −1.6360E−03 | 2.5628E−02 | −9.1737E−02 | 1.1423E+00 |
| A8 = | 4.3764E−05 | 9.0033E−04 | 6.1920E−02 | −2.1902E+00 |
| A10 = | 1.7320E−08 | — | −1.4133E−02 | 1.9704E+00 |

TABLE 22-continued

| Aspheric Coefficients | | | | |
|---|---|---|---|---|
| Surface # | 6 | 7 | 8 | 9 |
| k = | −9.4430E+00 | −2.0139E+00 | −5.6548E+00 | 5.0000E+01 |
| A4 = | 1.5601E−01 | −2.0057E−01 | −4.1693E−01 | −3.4900E−02 |
| A6 = | −3.5037E−02 | 4.9649E−01 | 9.6991E−01 | 2.0664E−01 |
| A8 = | −7.5181E−02 | −6.8559E−01 | −1.3124E+00 | −1.9299E−01 |
| A10 = | — | 2.8579E−01 | 6.8155E−01 | 1.1893E−01 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.49 | CT2/ΣCT | 0.39 |
| Fno | 2.45 | \|Dr4s/Dr3s\| | 0.03 |
| HFOV [deg.] | 70.0 | \|Dr5s/Dr6s\| | 0.05 |
| tan(HFOV) | 2.75 | R5/R4 | −0.04 |
| V4 | 55.8 | (R5 + R6)/(R5 − R6) | 0.05 |
| T23/T12 | 0.08 | (R7 + R8)/(R7 − R8) | −1.09 |
| T12/f | 0.81 | f4/f1 | 0.69 |
| CT2/T12 | 1.58 | ff/fr | −1.11 |
| CT2/CT1 | 1.19 | TL/f | 5.99 |
| CT3/CT2 | 0.54 | SL/TL | 0.47 |

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising, in order from an object side to an image side:
 a first lens element with negative refractive power having an image-side surface being concave in a paraxial region thereof;
 a second lens element having negative refractive power;
 a third lens element having positive refractive power; and
 a fourth lens element having negative refractive power;
 wherein the imaging lens system has a total of four lens elements, and the imaging lens system further comprises an aperture stop disposed between the second lens element and the third lens element; an axial distance between the first lens element and the second lens element is T12, an axial distance between the second lens element and the third lens element is T23, an axial distance between an object-side surface of the second lens element and the aperture stop is Dr3s, an axial distance between an image-side surface of the second lens element and the aperture stop is Dr4s, an axial distance between an object-side surface of the third lens element and the aperture stop is Dr5s, an axial distance between an image-side surface of the third lens element and the aperture stop is Dr6s, and the following conditions are satisfied:

$$0 < T23/T12 < 0.45;$$

$$0 < |Dr4s/Dr3s| < 0.80; \text{ and}$$

$$0 < |Dr5s/Dr6s| < 0.80.$$

2. The imaging lens system of claim 1, wherein the first lens element has an object-side surface being concave in a paraxial region thereof.

3. The imaging lens system of claim 1, wherein the fourth lens element has an image-side surface being concave in a paraxial region thereof.

4. The imaging lens system of claim 1, wherein the object-side surface of the second lens element is concave in a paraxial region thereof.

5. The imaging lens system of claim 1, wherein the axial distance between the first lens element and the second lens element is T12, the axial distance between the second lens element and the third lens element is T23, and the following condition is satisfied:

$$0 < T23/T12 < 0.25.$$

6. The imaging lens system of claim 1, wherein a central thickness of the second lens element is CT2, a central thickness of the third lens element is CT3, and the following condition is satisfied:

$$CT3/CT2 < 1.20.$$

7. The imaging lens system of claim 1, wherein object-side surfaces and image-side surfaces of the first lens element, the second lens element, the third lens element and the fourth lens element are all aspheric, and each of the first lens element, the second lens element, the third lens element and the fourth lens element is a single and non-cemented lens element; a half of a maximal field of view of the imaging lens system is HFOV, and the following condition is satisfied:

$$1.40 < \tan(HFOV).$$

8. The imaging lens system of claim 1, wherein a curvature radius of an object-side surface of the fourth lens element is R7, a curvature radius of an image-side surface of the fourth lens element is R8, and the following condition is satisfied:

$$-2.50 < (R7+R8)/(R7-R8) < 2.60.$$

9. The imaging lens system of claim 1, wherein a focal length of the first lens element is f1, a focal length of the fourth lens element is f4, and the following condition is satisfied:

$0 < f4/f1 < 1.0$.

10. An image capturing unit, comprising:
the imaging lens system of claim 1; and
an image sensor, wherein the image sensor is disposed on an image surface of the imaging lens system.

11. An electronic device, comprising:
the image capturing unit of claim 10.

12. An imaging lens system comprising, in order from an object side to an image side:
a first lens element with negative refractive power having an image-side surface being concave in a paraxial region thereof;
a second lens element with negative refractive power having an image-side surface being concave in a paraxial region thereof;
a third lens element having positive refractive power; and
a fourth lens element having negative refractive power;
wherein the imaging lens system has a total of four lens elements, each of the first lens element, the second lens element, the third lens element and the fourth lens element is a single and non-cemented lens element, and the imaging lens system further comprises an aperture stop disposed between the second lens element and the third lens element; a central thickness of the first lens element is CT1, a central thickness of the second lens element is CT2, and the following condition is satisfied:

$0 < CT2/CT1 < 3.5$.

13. The imaging lens system of claim 12, wherein an Abbe number of the fourth lens element is V4, and the following condition is satisfied:

$V4 < 25.0$.

14. The imaging lens system of claim 12, wherein the central thickness of the first lens element is CT1, the central thickness of the second lens element is CT2, and the following condition is satisfied:

$0 < CT2/CT1 < 2.0$.

15. The imaging lens system of claim 12, wherein a curvature radius of an object-side surface of the third lens element is R5, a curvature radius of an image-side surface of the third lens element is R6, and the following condition is satisfied:

$-1.0 < (R5+R6)/(R5-R6) < 1.0$.

16. The imaging lens system of claim 12, wherein a curvature radius of an object-side surface of the third lens element is R5, a curvature radius of an image-side surface of the third lens element is R6, and the following condition is satisfied:

$0 < (R5+R6)/(R5-R6) < 0.60$.

17. The imaging lens system of claim 12, wherein an axial distance between the first lens element and the second lens element is T12, a focal length of the imaging lens system is f, and the following condition is satisfied:

$0.45 < T12/f$.

18. The imaging lens system of claim 12, wherein an axial distance between the aperture stop and an image surface is SL, an axial distance between an object-side surface of the first lens element and the image surface is TL, and the following condition is satisfied:

$0.10 < SL/TL < 0.48$.

19. The imaging lens system of claim 12, wherein an axial distance between an object-side surface of the first lens element and an image surface is TL, a focal length of the imaging lens system is f, and the following condition is satisfied:

$4.8 < TL/f$.

20. An imaging lens system comprising, in order from an object side to an image side:
a first lens element with negative refractive power having an image-side surface being concave in a paraxial region thereof;
a second lens element with negative refractive power having an image-side surface being concave in a paraxial region thereof;
a third lens element with positive refractive power having an object-side surface being convex in a paraxial region thereof; and
a fourth lens element having negative refractive power;
wherein the imaging lens system has a total of four lens elements, a curvature radius of the image-side surface of the second lens element is R4, a curvature radius of the object-side surface of the third lens element is R5, a central thickness of the second lens element is CT2, an axial distance between the first lens element and the second lens element is T12, and the following conditions are satisfied:

$0 < R5/R4 < 0.70$; and $0 < CT2/T12 < 3.0$.

21. The imaging lens system of claim 20, wherein at least one of an object-side surface and the image-side surface of the first lens element has at least one inflection point.

22. The imaging lens system of claim 20, wherein at least one of an object-side surface and an image-side surface of the fourth lens element has at least one inflection point.

23. The imaging lens system of claim 20, wherein an axial distance between an object-side surface of the first lens element and an image surface is TL, a focal length of the imaging lens system is f, and the following condition is satisfied:

$5.5 < TL/f$.

24. The imaging lens system of claim 20, further comprising an aperture stop, wherein there are a front lens group comprising at least one of the lens elements of the imaging lens system located between an imaged object and the aperture stop, and a rear lens group comprising the other at least one of the lens elements of the imaging lens system located between the aperture stop and an image surface; a focal length of the front lens group is ff, a focal length of the rear lens group is fr, and the following condition is satisfied:

$-1.5 < ff/fr < -1.0$.

25. The imaging lens system of claim 20, wherein the central thickness of the second lens element is CT2, a sum of central thicknesses of the lens elements of the imaging lens system is ΣCT, and the following condition is satisfied:

$0 < CT2/\Sigma CT < 0.45$.

26. The imaging lens system of claim 20, further comprising an aperture stop, wherein an axial distance between the aperture stop and an image surface is SL, an axial distance between an object-side surface of the first lens element and the image surface is TL, and the following condition is satisfied:

$0.10 < SL/TL < 0.48$.

* * * * *

UNITED STATES PATENT AND TRADEMARK OFFICE
CERTIFICATE OF CORRECTION

PATENT NO. : 9,798,105 B2
APPLICATION NO. : 15/131844
DATED : October 24, 2017
INVENTOR(S) : Hsin-Hsuan Huang et al.

Page 1 of 1

It is certified that error appears in the above-identified patent and that said Letters Patent is hereby corrected as shown below:

In the Claims

At Column 40, Line 65 (Claim 25, Line 4), please delete "lens system is/CT, and the following condition is satisfied:" and insert --lens system is $\Sigma CT$, and the following condition is satisfied:-- therefor.

Signed and Sealed this
Twelfth Day of December, 2017

Joseph Matal
*Performing the Functions and Duties of the
Under Secretary of Commerce for Intellectual Property and
Director of the United States Patent and Trademark Office*